(12) United States Patent
Peters et al.

(10) Patent No.: US 10,059,581 B2
(45) Date of Patent: Aug. 28, 2018

(54) SYSTEMS AND METHODS FOR DISPENSING CONSUMABLE PRODUCTS

(71) Applicant: The Coca-Cola Company, Atlanta, GA (US)

(72) Inventors: Dan Peters, Alpharetta, GA (US); Son V. Tran, Alpharetta, GA (US); David R. Newman, Atlanta, GA (US); Leonard F. Antao, Smyrna, GA (US); David O. Slagley, Roswell, GA (US); H. Brock Kolls, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 83 days.

(21) Appl. No.: 15/401,860

(22) Filed: Jan. 9, 2017

(65) Prior Publication Data

US 2017/0113914 A1 Apr. 27, 2017

Related U.S. Application Data

(63) Continuation of application No. 14/299,776, filed on Jun. 9, 2014, now Pat. No. 9,569,748, which is a (Continued)

(51) Int. Cl.
B67D 1/08 (2006.01)
B67D 1/00 (2006.01)
(Continued)

(52) U.S. Cl.
CPC ........ B67D 1/0888 (2013.01); B67D 1/0041 (2013.01); G05B 15/02 (2013.01);
(Continued)

(58) Field of Classification Search
CPC ........ G07F 13/02; G07F 13/06; B67D 1/0041
(Continued)

(56) References Cited

U.S. PATENT DOCUMENTS 3,991,911 A 11/1976 Shannon et al.
4,358,171 A 11/1982 Christen
(Continued)

FOREIGN PATENT DOCUMENTS

BE 1005369 A6 7/1993
CN 1378432 A 11/2002
(Continued)

OTHER PUBLICATIONS

Disclosure under 37 C.F.R. § 1.56 as filed Dec. 22, 2008.
(Continued)

Primary Examiner — Timothy R Waggoner
(74) Attorney, Agent, or Firm — Eversheds Sutherland (US) LLP

(57) ABSTRACT

Systems, methods, and computer-readable media are described for dispensing consumable products. An example method may include generating, at a controller associated with a beverage dispenser, a beverage composition record for a beverage that is formulated via an ingredient matrix and dispensed at the beverage dispenser, where the ingredient matrix comprises multiple ingredient packages each comprising a beverage ingredient. The method may include writing depletion data to the ingredient package or to a data processing device associated with the ingredient package for each ingredient package from which a beverage ingredient was included in the dispensed beverage, wherein the depletion data is based at least in part on the beverage composition record.

20 Claims, 9 Drawing Sheets

Related U.S. Application Data continuation of application No. 12/204,505, filed on Sep. 4, 2008, now Pat. No. 8,751,037.

(60) Provisional application No. 60/970,514, filed on Sep. 6, 2007.

(51) Int. Cl.

| | |
|---|---|
| *G06Q 10/08* | (2012.01) |
| *G07F 9/02* | (2006.01) |
| *G07F 11/00* | (2006.01) |
| *G07F 13/06* | (2006.01) |
| *G05B 15/02* | (2006.01) |
| *G06K 7/10* | (2006.01) |

(52) U.S. Cl.
CPC ....... *G06K 7/10009* (2013.01); *G06Q 10/087* (2013.01); *G07F 9/02* (2013.01); *G07F 9/026* (2013.01); *G07F 11/002* (2013.01); *G07F 13/065* (2013.01); *B67D 2210/00089* (2013.01)

(58) Field of Classification Search
USPC .................................................. 700/231–244
See application file for complete search history.

(56) References Cited

U.S. PATENT DOCUMENTS

| | | |
|---|---|---|
| 4,525,071 A | 6/1985 | Horowitz et al. |
| 4,563,739 A | 1/1986 | Gerpheide et al. |
| 4,819,176 A | 4/1989 | Ahmed et al. |
| 5,147,068 A | 9/1992 | Wright |
| 5,225,819 A | 7/1993 | Hosotani et al. |
| 5,312,017 A | 5/1994 | Schroeder et al. |
| 5,350,082 A | 9/1994 | Kiriakides, Jr. et al. |
| 5,358,145 A | 10/1994 | Smith et al. |
| 5,408,917 A | 4/1995 | Lussi |
| 5,603,430 A | 2/1997 | Loehrke et al. |
| 5,615,801 A | 4/1997 | Schroeder et al. |
| 5,691,684 A | 11/1997 | Murrah |
| 5,715,700 A | 2/1998 | Credle, Jr. |
| 5,735,436 A | 4/1998 | Schroeder et al. |
| 5,765,171 A | 6/1998 | Gehani et al. |
| 5,798,694 A | 8/1998 | Reber et al. |
| 5,832,520 A | 11/1998 | Miller |
| 5,839,610 A | 11/1998 | Reese et al. |
| 5,842,603 A | 12/1998 | Schroeder et al. |
| 5,884,807 A | 3/1999 | Yun |
| 5,997,924 A | 12/1999 | Olander, Jr. et al. |
| 6,053,359 A | 4/2000 | Goulet et al. |
| 6,116,460 A | 9/2000 | Kim et al. |
| 6,119,434 A | 9/2000 | Andersson |
| 6,131,399 A | 10/2000 | Hall |
| 6,152,591 A | 11/2000 | McCall et al. |
| 6,161,059 A | 12/2000 | Tedesco et al. |
| 6,238,721 B1 | 5/2001 | Knepler |
| 6,317,649 B1 | 11/2001 | Tedesco et al. |
| 6,354,468 B1 | 3/2002 | Riek |
| 6,377,868 B1 | 4/2002 | Gardner, Jr. |
| 6,378,275 B1 | 4/2002 | Andersson |
| 6,424,884 B1 | 7/2002 | Brooke, Jr. et al. |
| 6,465,035 B1 | 10/2002 | Knepler |
| 6,470,233 B1 | 10/2002 | Johnson, Jr. |
| 6,479,086 B1 | 11/2002 | Knepler |
| 6,564,999 B1 | 5/2003 | Saveliev et al. |
| 6,572,016 B2 | 6/2003 | Saveliev et al. |
| 6,607,013 B1 | 8/2003 | Leoni |
| 6,618,062 B1 | 9/2003 | Brown et al. |
| 6,622,064 B2 | 9/2003 | Bartholomew et al. |
| 6,658,323 B2 | 12/2003 | Tedesco et al. |
| 6,688,134 B2 | 2/2004 | Barton et al. |
| 6,698,228 B2 | 3/2004 | Kateman et al. |
| 6,735,493 B1 | 5/2004 | Chou et al. |
| 6,751,525 B1 * | 6/2004 | Crisp, III ............. B67D 1/0057 222/25 |
| 6,756,069 B2 | 6/2004 | Scoville et al. |
| 6,759,072 B1 | 7/2004 | Gutwein et al. |
| 6,772,944 B2 | 8/2004 | Brown |
| 6,799,085 B1 | 9/2004 | Crisp, III |
| 6,807,460 B2 | 10/2004 | Black et al. |
| 6,907,741 B2 | 6/2005 | Kateman |
| 6,918,258 B2 | 7/2005 | Cunha et al. |
| 6,941,858 B2 | 9/2005 | Kateman |
| 6,968,876 B2 | 11/2005 | Yacko et al. |
| 6,973,478 B1 | 12/2005 | Ketonen et al. |
| 6,974,928 B2 | 12/2005 | Bloom |
| 6,975,910 B1 | 12/2005 | Brown et al. |
| 6,980,887 B2 | 12/2005 | Varga et al. |
| 6,982,640 B2 | 1/2006 | Lindsay et al. |
| 6,990,391 B1 | 1/2006 | Cunha et al. |
| 7,009,519 B2 | 3/2006 | Leonard et al. |
| 7,020,680 B2 | 3/2006 | Defosse |
| 7,028,861 B2 | 4/2006 | Sayers et al. |
| 7,031,804 B2 | 4/2006 | Brooke, Jr. et al. |
| 7,032,818 B2 | 4/2006 | Thomas et al. |
| 7,053,773 B2 | 5/2006 | McGarry et al. |
| 7,065,429 B1 | 6/2006 | McClain et al. |
| 7,082,970 B2 | 8/2006 | Bartholomew et al. |
| 7,147,131 B2 | 12/2006 | Sher et al. |
| 7,151,982 B2 | 12/2006 | Liff et al. |
| 7,156,259 B2 | 1/2007 | Bethuy et al. |
| 7,161,494 B2 | 1/2007 | Akuzawa |
| 7,171,616 B1 | 1/2007 | Berstis |
| 7,223,427 B2 | 5/2007 | Knepler |
| 7,231,279 B2 | 6/2007 | Ghidotti |
| 7,234,609 B2 | 6/2007 | DeLazzer et al. |
| 7,249,050 B1 | 7/2007 | Walker et al. |
| 7,260,443 B2 | 8/2007 | Morinaga et al. |
| 7,331,483 B2 | 2/2008 | Bhimani et al. |
| 7,353,080 B2 | 4/2008 | Walker et al. |
| 7,387,239 B2 | 6/2008 | Thomas et al. |
| 7,391,318 B2 | 6/2008 | Higashi |
| 7,395,134 B2 * | 7/2008 | Bartholomew ........ A45D 29/00 222/1 |
| 7,499,768 B2 | 3/2009 | Hoersten et al. |
| 7,499,769 B2 | 3/2009 | Walker et al. |
| 7,627,496 B2 | 12/2009 | Walker et al. |
| 7,640,755 B1 | 1/2010 | Kateman |
| 7,673,555 B2 | 3/2010 | Nosler et al. |
| 7,912,579 B2 | 3/2011 | Stettes |
| 7,918,368 B2 | 4/2011 | Crisp et al. |
| 8,276,505 B2 | 10/2012 | Buehler |
| 8,340,815 B2 | 12/2012 | Peters et al. |
| 9,218,704 B2 | 12/2015 | Lim et al. |
| 2002/0059175 A1 | 5/2002 | Nakano |
| 2002/0065579 A1 | 5/2002 | Tedesco et al. |
| 2002/0077889 A1 | 6/2002 | Kolls |
| 2002/0116261 A1 | 8/2002 | Moskowitz et al. |
| 2002/0123926 A1 | 9/2002 | Bushold et al. |
| 2002/0129712 A1 | 9/2002 | Westbrook et al. |
| 2002/0143626 A1 | 10/2002 | Voltmer et al. |
| 2002/0161653 A1 | 10/2002 | Walker et al. |
| 2002/0183893 A1 | 12/2002 | Brooke, Jr. et al. |
| 2003/0010791 A1 | 1/2003 | Gentiluomo et al. |
| 2003/0032474 A1 | 2/2003 | Kaminkow |
| 2003/0083758 A1 | 5/2003 | Williamson |
| 2003/0129286 A1 | 7/2003 | Knepler |
| 2003/0191709 A1 | 10/2003 | Elston et al. |
| 2003/0216964 A1 | 11/2003 | MacLean et al. |
| 2004/0044584 A1 | 3/2004 | Chung |
| 2004/0103033 A1 | 5/2004 | Reade et al. |
| 2004/0113786 A1 | 6/2004 | Maloney |
| 2004/0129720 A1 | 7/2004 | Cheng et al. |
| 2004/0226994 A1 | 11/2004 | Brown |
| 2004/0243259 A1 | 12/2004 | Peterson et al. |
| 2005/0003068 A1 | 1/2005 | Kester et al. |
| 2005/0075900 A1 | 4/2005 | Arguimbau |
| 2005/0143857 A1 | 6/2005 | Chirnomas |
| 2005/0167493 A1 | 8/2005 | Barton et al. |
| 2005/0178144 A1 | 8/2005 | Crisp |
| 2005/0178793 A1 | 8/2005 | Cheng |
| 2005/0182599 A1 | 8/2005 | Knepler et al. |
| 2005/0192705 A1 | 9/2005 | Pinney et al. |
| 2005/0205666 A1 | 9/2005 | Ward et al. |

(56) References Cited

U.S. PATENT DOCUMENTS

| | | |
|---|---|---|
| 2005/0258961 A1 | 11/2005 | Kimball et al. |
| 2005/0276883 A1 | 12/2005 | Jeffrey et al. |
| 2006/0000851 A1 | 1/2006 | Girard et al. |
| 2006/0043101 A1 | 3/2006 | Bhimani et al. |
| 2006/0043111 A1 | 3/2006 | Jennings et al. |
| 2006/0051614 A1 | 3/2006 | Su et al. |
| 2006/0054614 A1 | 3/2006 | Baxter et al. |
| 2006/0058918 A1* | 3/2006 | Handfield ............ A61J 7/0084 700/236 |
| 2006/0081653 A1 | 4/2006 | Boland et al. |
| 2006/0102645 A1 | 5/2006 | Walker et al. |
| 2006/0108415 A1 | 5/2006 | Thomas et al. |
| 2006/0111978 A1 | 5/2006 | Tietzen et al. |
| 2006/0115570 A1 | 6/2006 | Guerrero et al. |
| 2006/0115572 A1 | 6/2006 | Guerrero et al. |
| 2006/0131329 A1 | 6/2006 | Sayers et al. |
| 2006/0144244 A1 | 7/2006 | Girard et al. |
| 2006/0180647 A1 | 8/2006 | Hansen |
| 2006/0192003 A1 | 8/2006 | Chung |
| 2006/0224696 A1 | 10/2006 | King et al. |
| 2006/0247824 A1 | 11/2006 | Walker et al. |
| 2006/0261156 A1 | 11/2006 | Brown |
| 2006/0272922 A1 | 12/2006 | Hoersten et al. |
| 2007/0016852 A1 | 1/2007 | Kim et al. |
| 2007/0027576 A1 | 2/2007 | Juds et al. |
| 2007/0044820 A1 | 3/2007 | Chan et al. |
| 2007/0087756 A1 | 4/2007 | Hoffberg |
| 2007/0124204 A1 | 5/2007 | De Boer et al. |
| 2007/0252709 A1 | 11/2007 | Collins et al. |
| 2007/0299555 A1 | 12/2007 | Walker et al. |
| 2008/0004973 A1 | 1/2008 | Rothschild |
| 2008/0029541 A1 | 2/2008 | Wallace et al. |
| 2008/0051193 A1 | 2/2008 | Kaminkow et al. |
| 2008/0116262 A1 | 5/2008 | Majer |
| 2008/0173705 A1 | 7/2008 | Girard et al. |
| 2008/0201241 A1 | 8/2008 | Pecoraro |
| 2009/0065520 A1 | 3/2009 | Peters et al. |
| 2009/0069931 A1 | 3/2009 | Peters et al. |
| 2009/0069949 A1 | 3/2009 | Carpenter et al. |
| 2009/0070234 A1 | 3/2009 | Peters et al. |
| 2010/0114368 A1 | 5/2010 | Walker et al. |
| 2010/0116842 A1 | 5/2010 | Hecht et al. |
| 2011/0315711 A1 | 12/2011 | Hecht et al. |
| 2012/0037008 A1 | 2/2012 | Rodriguez |
| 2013/0079926 A1 | 3/2013 | Peters et al. |

FOREIGN PATENT DOCUMENTS

| | | |
|---|---|---|
| DE | 4013147 A1 | 10/1991 |
| EP | 1165428 B1 | 7/2003 |
| EP | 1626375 A1 | 2/2006 |
| EP | 1637055 A2 | 3/2006 |
| FR | 2624844 A1 | 6/1989 |
| GB | 2416757 A | 2/2006 |
| JP | 59-55597 A | 3/1984 |
| JP | 61-288289 A | 12/1986 |
| JP | 05-089329 A | 4/1993 |
| JP | 05-094577 A | 4/1993 |
| JP | 05-128349 A | 5/1993 |
| JP | 11-262649 A | 9/1999 |
| JP | 2000-099822 A | 4/2000 |
| JP | 2001-250161 A | 9/2001 |
| JP | 2001-319026 A | 11/2001 |
| JP | 2002-099950 A | 4/2002 |
| JP | 2002-245536 A | 8/2002 |
| JP | 2002-538561 A | 11/2002 |
| JP | 2003-016164 A | 1/2003 |
| JP | 2003-506184 A | 2/2003 |
| JP | 2003-121505 A | 4/2003 |
| JP | 2003-303372 A | 10/2003 |
| JP | 2003-337974 A | 11/2003 |
| JP | 2005-089329 A | 4/2005 |
| JP | 2005-094577 A | 4/2005 |
| JP | 2005-276148 A | 10/2005 |
| JP | 2006-309336 A | 11/2006 |
| JP | 2009-524868 A | 7/2009 |
| RU | 2054901 C1 | 2/1996 |
| RU | 2146102 C1 | 3/2000 |
| RU | 2297385 C2 | 4/2007 |
| WO | 1998/037518 A1 | 8/1998 |
| WO | 2002/011087 A1 | 2/2002 |
| WO | 2002/083282 A1 | 10/2002 |
| WO | 2005/063091 A1 | 7/2005 |
| WO | 2005/091236 A1 | 9/2005 |
| WO | 2006/101394 A2 | 9/2006 |
| WO | 2006/131431 A1 | 12/2006 |
| WO | 2007/056407 A2 | 5/2007 |
| WO | 2007/070032 A1 | 6/2007 |
| WO | 2007/085925 A1 | 8/2007 |
| WO | 2007/127525 A2 | 11/2007 |
| WO | 2009/032911 A1 | 3/2009 |
| WO | 2009/032938 A2 | 3/2009 |
| WO | 2009/032942 A2 | 3/2009 |
| WO | 2009/032946 A1 | 3/2009 |

OTHER PUBLICATIONS

International Search Report and Written Opinion for PCT/US2008/075235, dated Feb. 4, 2009.

International Search Report and Written Opinion for PCT/US2008/075287, dated Feb. 18, 2009.

International Search Report and Written Opinion for PCT/US2008/075272, dated Apr. 6, 2009.

International Search Report and Written Opinion for PCT/US2008/075277, dated Apr. 24, 2009.

Invitation to Pay Additional Fee and Partial International Search Report for PCT/US2008/075281, dated Mar. 13, 2009.

* cited by examiner

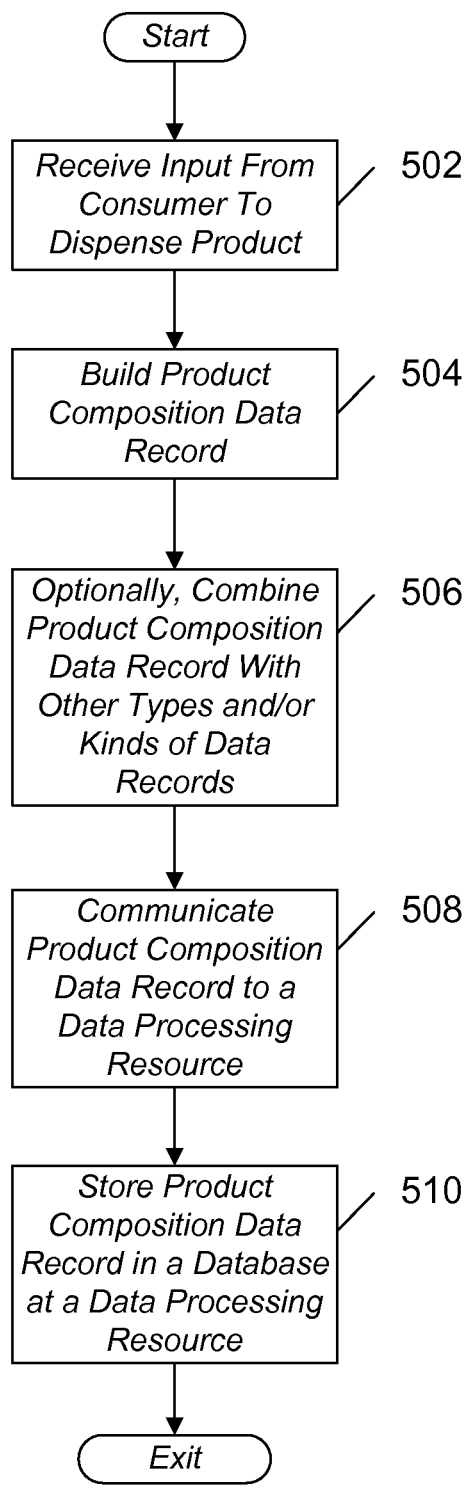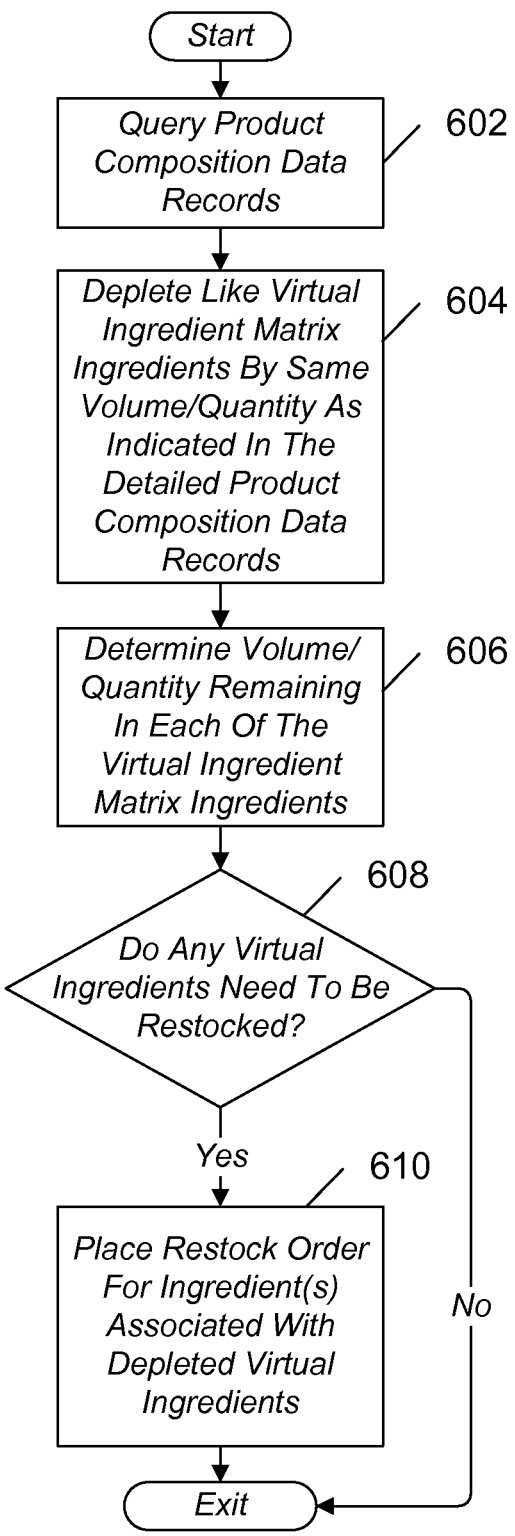

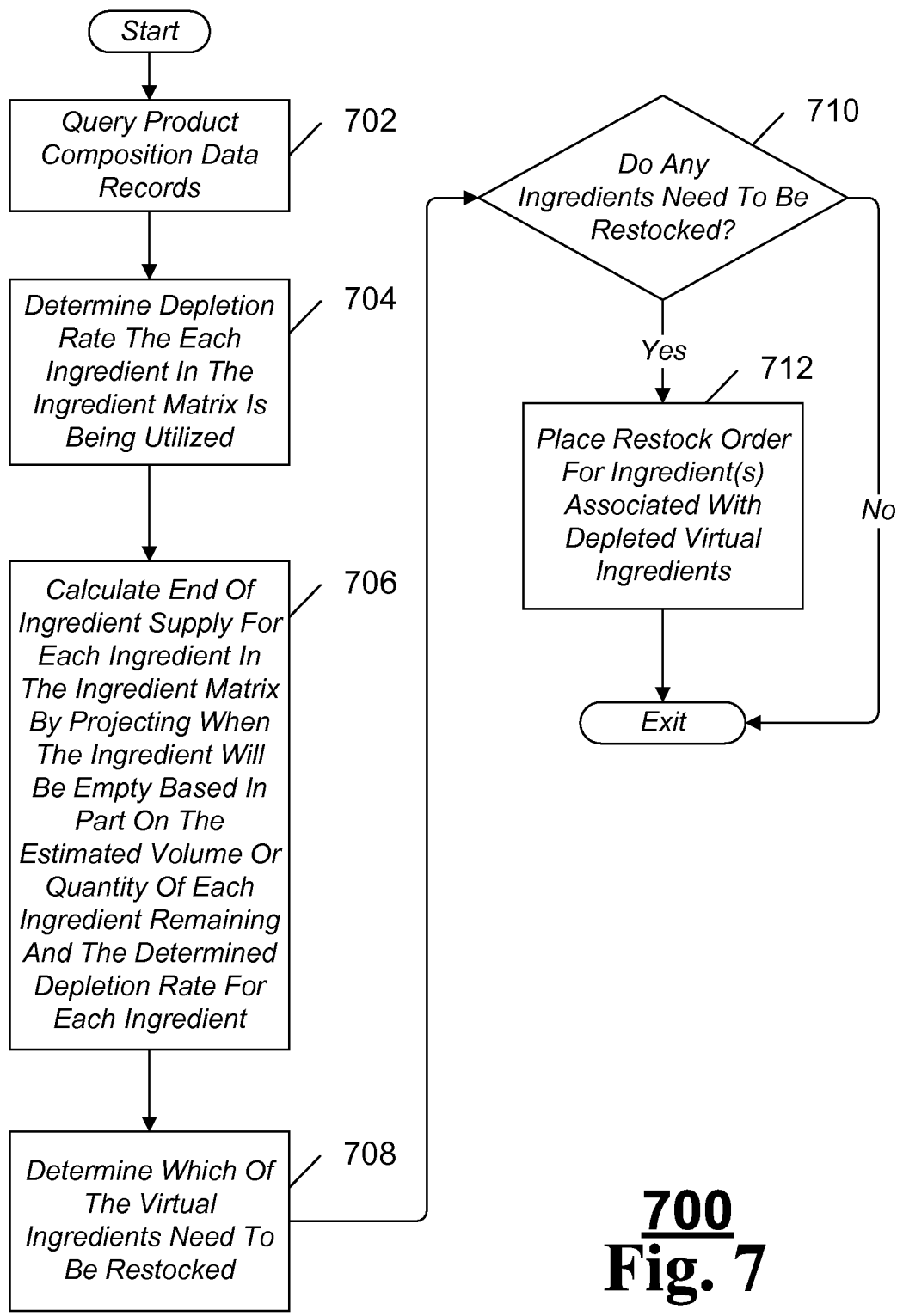

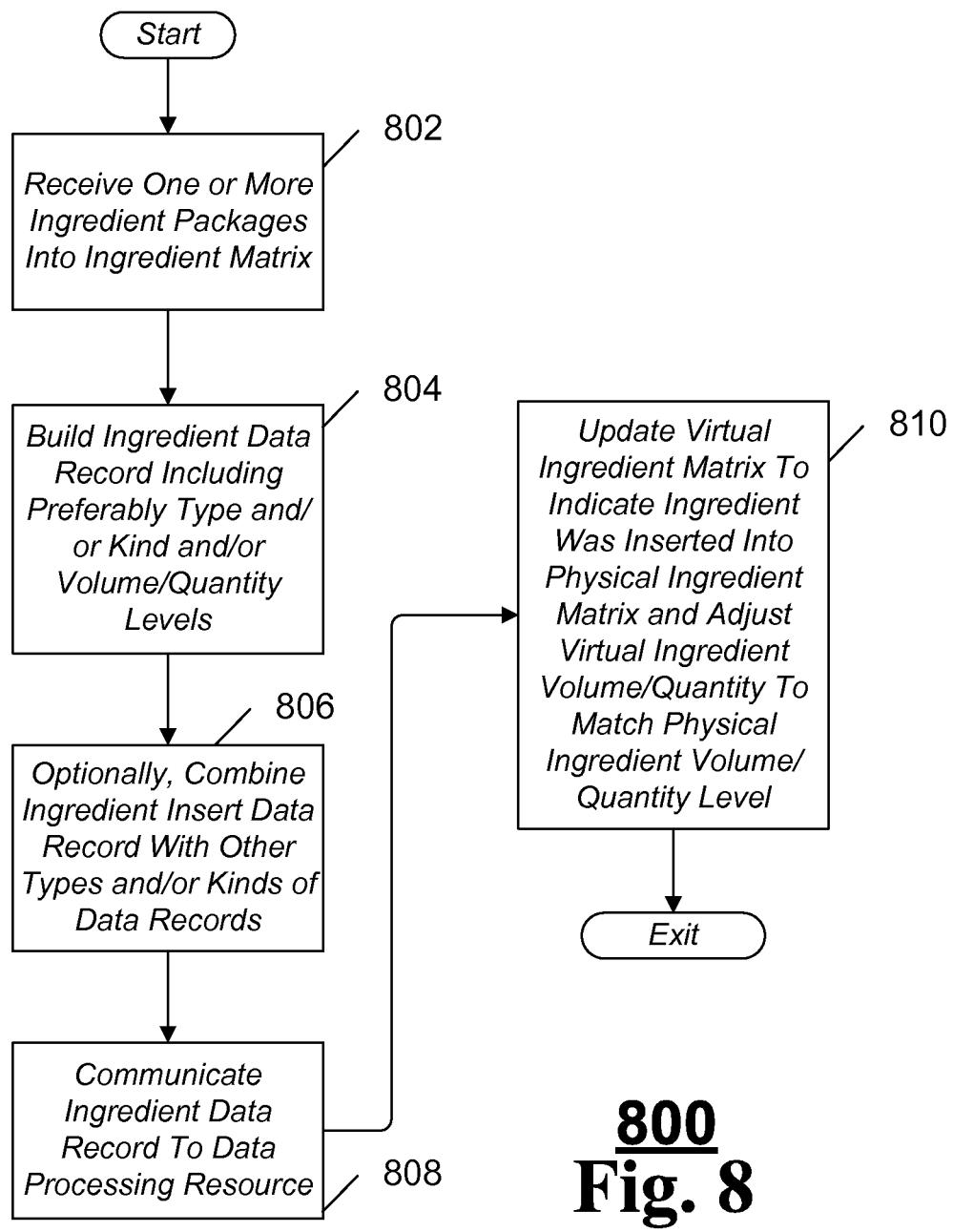

900

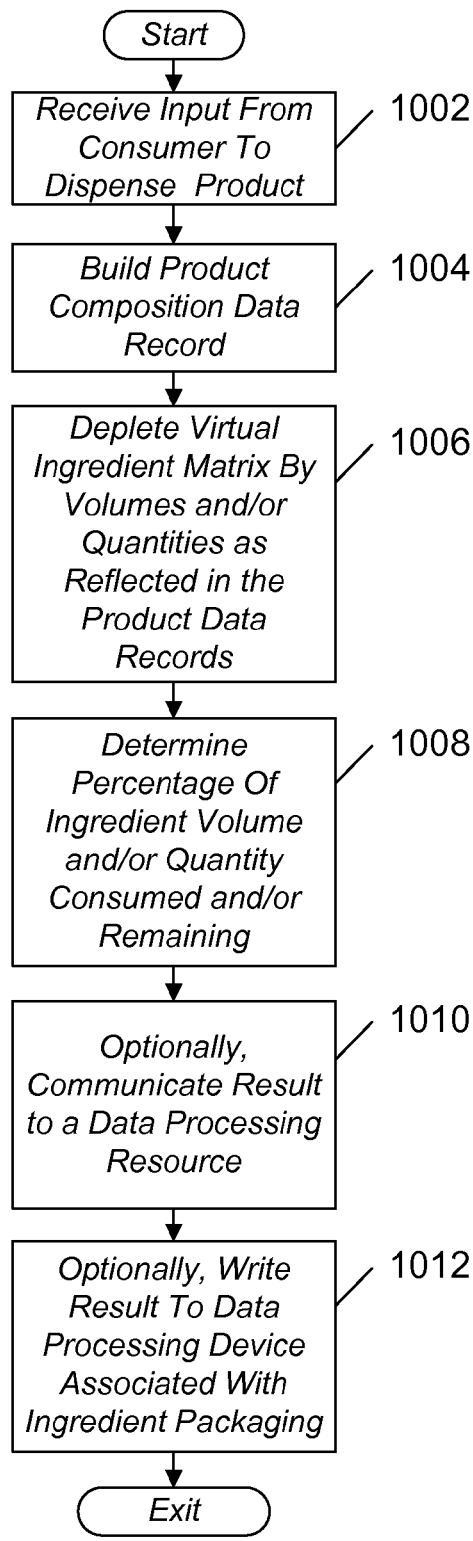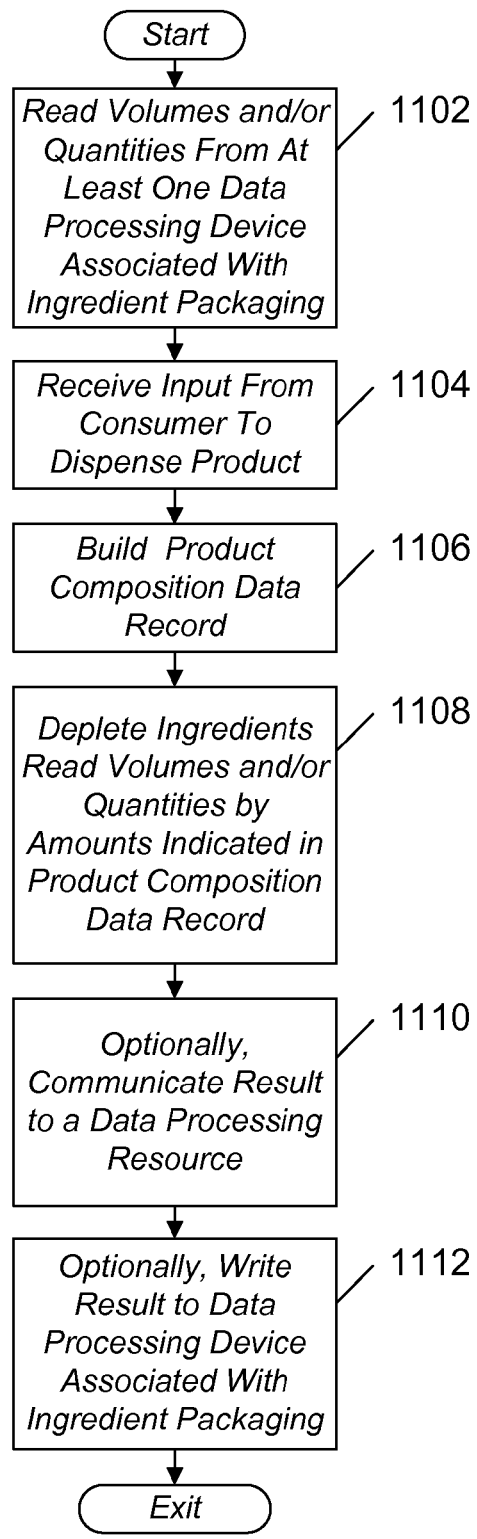

1200

SYSTEMS AND METHODS FOR DISPENSING CONSUMABLE PRODUCTS

RELATED APPLICATIONS

This application is a continuation of U.S. application Ser. No. 14/299,776, filed Jun. 9, 2014, which is a continuation of U.S. application Ser. No. 12/204,505, filed Sep. 4, 2008, now U.S. Pat. No. 8,751,037, issued Jun. 10, 2014 which claims the benefit of U.S. Provisional Ser. No. 60/970,514, entitled "Systems and Methods for Dispensing Consumable Products," filed on Sep. 6, 2007, the contents of which are incorporated by reference.

TRADEMARKS

COCA-COLA® is a registered trademark of The Coca-Cola Company, Atlanta, Ga., U.S.A. Other names, symbols, designs, or logos used herein may be registered trademarks, trademarks or product names of The Coca-Cola Company or other companies.

TECHNICAL FIELD

This invention relates to product dispensers, and in particular, relates to systems and methods for dispensing consumable products.

BACKGROUND OF THE INVENTION

Conventional beverage dispensers can pour a beverage by combining a syrup, sweetener, and/or water. To create a Unite variety of beverage selections different kinds of syrup can be offered. This typically results in being able to offer a finite number of branded and non-branded beverage selections. As an example, a single prior art dispenser using several different kinds of syrup might be able to offer limited choices of COCA-COLA™, DIET COCA-COLA™, SPRITE™, and a few other branded or non-branded beverage selections.

One problem with these types of conventional beverage dispensers is that only a limited number of drinks can be offered. As such, conventional beverage dispensers may be limited in being able to offer the consumer what they want. In this regard, consumers want a wider menu of beverage selections and the ability to customize their beverage. Research suggests that they want more beverage variations even for a traditional branded beverage. For example, offering COCA-COLA™, COCA-COLA™ with lime. CHERRY COCA-COLA™, VANILLA COCA-COLA™ and numerous other types of COCA-COLA™ beverage variations. Offering all the variations possible for a single drink brand such as COCA-COLA™ is impractical in conventional beverage dispensers in part because conventional beverage dispensers have limited capacity and selection capability. They may not offer the consumer what the consumer wants, that is, a complete variety of choices for all types of branded and non-branded beverages.

SUMMARY OF THE INVENTION

Some or ail of the above needs and/or problems may be addressed by embodiments of me invention. Certain embodiments of the invention can include systems and methods for dispensing consumable products. One embodiment of the invention can provide a product dispenser. The product dispenser can include an ingredient matrix operable to receive a plurality of product ingredients. In addition, the product dispenser can include a controller in communication with the ingredient matrix, and operable to execute a set of instructions to receive product data associated with the plurality of product ingredients. Moreover, the controller can further comprise a set of instructions to track usage of the plurality of product ingredients when at least one product is dispensed. Furthermore, the controller can further comprise a set of instructions to update the product data during or after dispensing of a product or installation of one or more product ingredients in the ingredient matrix.

In another embodiment, a method for operating a beverage dispenser can be provided. The method can include receiving product data associated with a plurality of product ingredients. In addition, the method can include tracking usage of the plurality of product ingredients when at least one product is dispensed. Furthermore, the method can include updating the product data during or after dispensing of a product or installation of one or more product ingredients in the ingredient matrix.

In yet another embodiment, a method for managing a product dispenser can be provided. The method can include receiving product data associated with it plurality of product ingredients installed within an ingredient matrix. In addition, the method can include tracking usage of the plurality of product ingredients when at least one product is dispensed. Furthermore, the method can include estimating when at least one of the plurality of product ingredients or virtual ingredients will be depleted. Moreover, the method can include transmitting an order for any depleted product ingredients via a network.

Yet another embodiment can provide a system for managing product ingredients. The system can include an ingredient matrix operable to receive a plurality of product ingredients. In addition, the system can include a controller in communication with the ingredient matrix, and operable to execute a set of instructions operable to receive product data associated with a plurality of product ingredients installed within an ingredient matrix. The controller can further comprise a set of instructions operable to track usage of the plurality of product ingredients when at least one product is dispensed. In addition, the controller can further comprise a set of instructions operable to estimate when at least one of the plurality of product ingredients will be depleted. Moreover, the controller can further comprise a set of instructions operable to transmit an order for any depleted product ingredients via a network.

Additional systems, methods, dispensers, features and aspects are realized through the techniques of various embodiments of the invention. Other embodiments and aspects of the invention are described in detail herein and are considered a part of the claimed invention. Other aspects and features can be understood with reference to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and aspects of the invention are apparent from the following detailed description taken in conjunction with the accompanying drawings in which:

FIG. 5 illustrates one example of a method of building a database of product composition data records in accordance with an embodiment of the invention.

FIG. 6 illustrates one example of a method of using a virtual ingredient matrix to track ingredient supply and ordering restock ingredients when virtual ingredient are below a threshold level in accordance with an embodiment of the invention.

FIG. 7 illustrates one example of a method of determining a depletion rate for each ingredient in an ingredient matrix, projecting when each ingredient will be empty based in part on estimated volume or quantity of each ingredient remaining, and then ordering restock ingredients when virtual ingredients are below a threshold level in accordance with an embodiment of the invention.

FIG. 8 illustrated one example of a method of synchronizing a virtual ingredient matrix ingredient volume or quantity level to match a restocked physical ingredient matrix ingredient volume or quantity level in accordance with an embodiment of the invention.

FIG. 10 illustrates one example of a method of determining the amount of ingredient volume and/or quantity consumed and/or remaining in an ingredient package in accordance with an embodiment of the invention.

FIG. 11 illustrates one example of a method of reading from ingredient packaging the volume or quantity consumed or remaining, adjusting the volume or quantity by processing a product composition data record, and data communicating and/or writing the result back to the ingredient packaging in accordance with an embodiment of the invention.

The detailed description explains various embodiments of the invention, together with aspects and features, by way of example with reference to the drawings.

DETAILED DESCRIPTION OF EMBODIMENTS Of THE INVENTION

As used herein, the terms "beverage forming dispenser", "product dispenser", "beverage dispenser", "dispenser apparatus", and "dispenser" refer to a device which dispenses a product such as a beverage, can, bottle, or container.

As used herein, the terms "product" and "beverage", and their pluralized forms, are used synonymously, and embodiments of the invention should not be limited in scope by the use of either term.

As used herein, the terms "product data" and "product composition data", and their pluralized forms, can be used synonymously, and refer to data associated with a product or beverage.

As used herein, the terms "virtual ingredient matrix level", "virtual ingredient", and their pluralized forms, refer to represent electronic or stored data associated with a physical ingredient matrix level or physical ingredient in a product dispenser, such as an ingredient matrix in a beverage dispenser.

Figure 1:
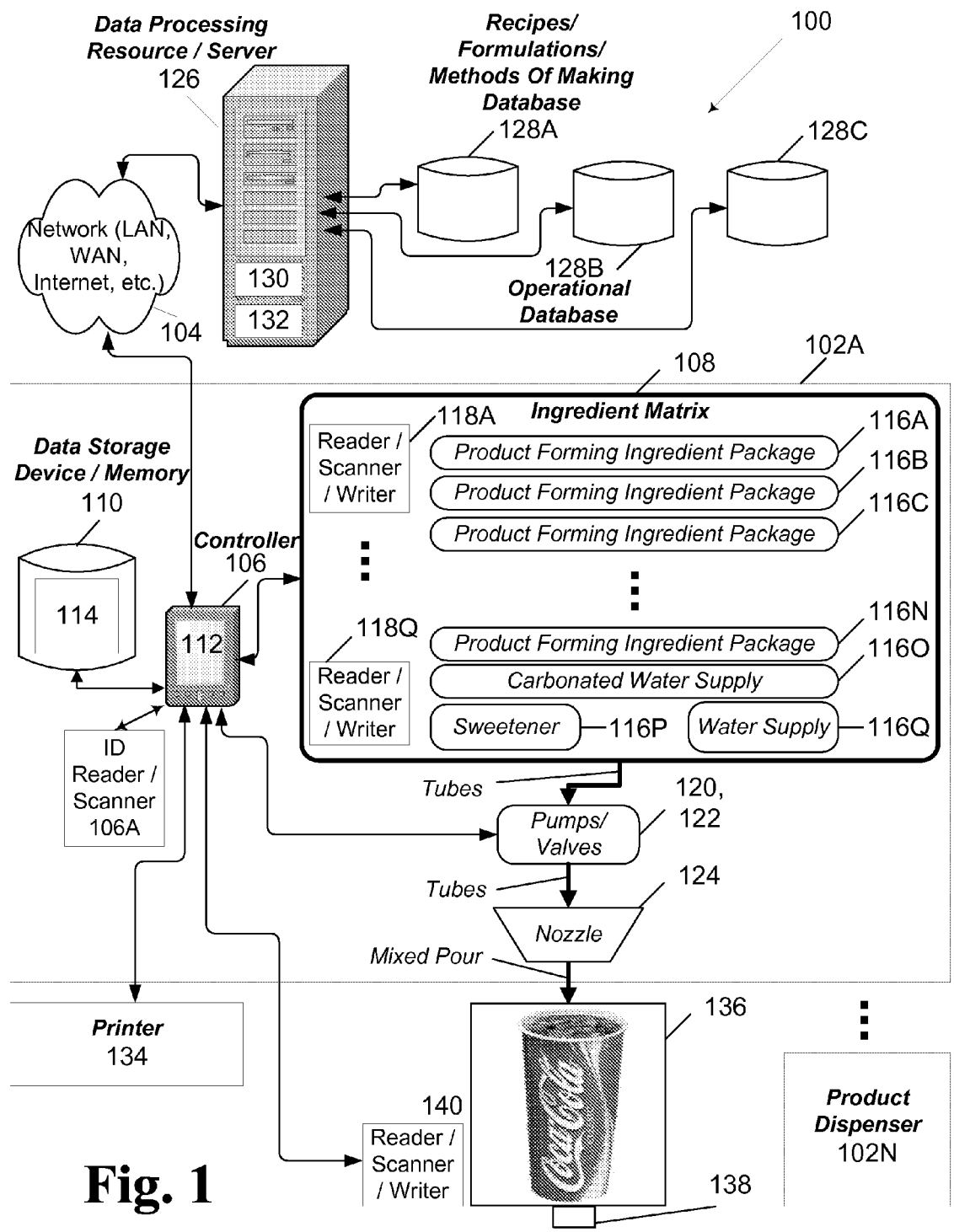
FIG. 1 illustrates an example system including a product dispenser and associated network in accordance with an embodiment of the invention.

Turning now to the drawings in greater detail, an example system 100 for a product dispenser according to an embodiment of the invention is shown in FIG. 1. The example system, such as 100, can operate with a networked computer environment which includes at least one network in communication with a product dispenser. For example in FIG. 1, a product dispenser 102A is shown in communications with a communications network 104. In this embodiment, at least one of the product dispensers, such as 102A, can interface with a consumer, customer, or other user. Other example environments or systems for a product dispenser according to an embodiment of the invention may include non-network configurations.

The example product dispenser, such as 102A shown in FIG. 1 can be a client-type device. Each product dispenser 102A-N can be a computer or processor-based device capable of communicating with the communications network 104 via a signal, such as a wireless frequency signal or a direct wired communication signal.

Each product dispenser, such as 102A, can include a processor or controller 106, an identification reader/scanner device 106A, an ingredient matrix 108, a computer-readable medium, such as a random access memory (RAM) 110, coupled to the processor or controller 106, and an input/output device, such as display device 112. The processor or controller, such as 106, can execute computer-executable program instructions stored in memory, such as 110. Computer executable program instructions stored in memory, such as 110, can include any number of module application programs, such as a consumer interaction engine or module, such as 114. The consumer interaction engine or module, such as 114, can be adapted to implement various methods for consumer-dispenser interaction. In addition, a consumer interaction engine or module, such as 114, can be adapted to receive one or more signals from one or more consumers, remote and/or local servers or data processing resources, and client-type devices or wireless communication devices. Other examples of functionality and aspects of embodiments of a consumer interaction engine or module, such as 114, are described below.

The identification reader/scanner device 106A shown in FIG. 1 can be in communication with the controller 106, and can receive or otherwise obtain identification information from any number of devices or means associated with a consumer. For example, an identification reader/scanner device, such as 106A, can include a machine readable code technology such as bar code, or may include any wireless communication technology such as RFID, reflected light frequency, optical, etc.

As shown in FIG. 1, the processor or controller, such as 106, can be in communication with an ingredient matrix, such as 108, to control, monitor, and track the addition, flow, and removal of some or all of the ingredients to or from the matrix, such as 108. An ingredient matrix can be, for example, a series of receptacles or mountings capable of receiving or mounting to a respective product ingredient package or other product ingredient supply. For example, a product ingredient package, such as 116A, can be manufactured as a pouch of liquid secured in a plastic ridged container to allow insertion into an ingredient matrix, such as 108. When inserted into the ingredient matrix, such as 108, the package, such as 116A, or pouch can be pierced by at least one associated fitting which allows the liquid in the package, such as 116A, or pouch to be pumped or otherwise metered by the controller, such as 106, or the matrix, such as 108, and associated equipment in precise ratios to form the desired product, such as a beverage. In one embodiment, one or more product ingredient packages, such as 116A-116Q, can be inserted into an ingredient matrix, such as 108. The ingredient matrix 108 in this embodiment can secure some or all of the product ingredient packages, such as 116A-116Q. In one embodiment, one or more product packages, such as 116O, 116P, 116Q may be direct supplies rather than packages. For example, a product package, such as 116O, can be a continuous supply of carbonated water provided from a carbonated water source; a product package, such as 116P, can be a sweetener provided from a sweetener source such as a non-nutritive sweetener (NNS) or high fructose corn syrup (HFCS); and a product package, such as 116Q, can be a continuous supply of water from a lap, purified, or distilled water source. In any embodiment, ingredients, components, or product additives may be in the form of a pouch, or may be in another configuration suitable for access by the ingredient matrix, such as 108.

In the embodiment shown in FIG. 1, a product dispenser, such as 102A, with an ingredient matrix, such as 108, can include one or more machine readable code readers, such as 118A-118Q, utilizing a machine readable code technology such as bar code, RFID, reflected light frequency, optical, etc. In one embodiment, at least one machine readable code reader, such as 118A-118Q, can be associated with a location associated with an ingredient matrix, such as 108, wherein some or all of the product ingredient packages, such as 116A-116Q, can be scanned, read, or otherwise identified prior to insertion into or connection with the ingredient matrix, such as 108. In this regard, the processor or controller, such as 106, can receive or obtain information related to some or all of the product ingredient packages, such as 116A-116Q, and use such information to identify within the ingredient matrix, such as 108, an optimum or other desired location within the ingredient matrix, such as 108, for placement of the product ingredient package, such as 116A. For example, data from a product ingredient package, such as 116A, can be read, scan, or identified from a serial number or identification code associated with the product ingredient package, such as 116A. Such data can be utilized alone or correlated with previously stored information in at least one database, such as 128A-128C, described below, or with data otherwise accessible or stored by a data processing resource or server, described below, such as 126, which may identify one or more ingredients associated with the product ingredient package, such as 116A. In another example, data from a product ingredient package, such as 116A, can be a ingredient code or identifier, and can be utilized alone or correlated with previously stored information in a database, such as 128A-128C, or with data otherwise accessible or stored by a data processing resource or server, such as 126, which may identify one or more ingredients associated with the product ingredient package, such as 116A.

In the embodiment shown in FIG. 1, a product dispenser, such as 102A, with an ingredient matrix, such as 108, can include one or more pumps and/or valves, such as 120 and 122 respectively, and a nozzle, such as 124. In this example, each of the pumps, such as 120, and valves, such as 122, can be controlled by the product dispenser, such as 102A. For instance, the processor or controller, such as 106, can be in communication with some or all of the pumps, such as 120, and valves, such as 122. In this regard, some or all of the pumps, such as 120, and/or valves, such as 122, can be selectively operated by the processor or controller, such as 106, to pump, meter, or otherwise obtain respective product products or ingredients from certain of the product ingredient packages, such as 116A-116Q, to dispense a custom product or beverage.

In one embodiment, an ingredient matrix, such as 108, can have multiple product ingredient packages, such as 116A-116Q, inserted into it, wherein each package may contain a different or unique ingredient. By way of one or more commands or instructions from a processor or controller, such as 106, to one or more pumps, such as 120 and/or valves, such as 122, associated with the ingredient matrix, such as 108, varying ratios of ingredients from some or all of the product ingredient packages, such as 116A-116Q, can be selectively combined to form various types of products, such as beverages. Example ingredients can include, but are not limited to, a flavoring, a concentrate, a syrup, a sweetener, water, carbonated water, a lime flavoring, vanilla flavoring, cherry flavoring, and any ingredient part of a branded or non-branded drink, such as CHERRY COCA-COLA™, VANILLA COCA-COLA™, COCA-COLA™, DIET COCA-COLA™, and FANTA™.

In one embodiment, one or more of the product ingredient packages, such as 116A-116Q, may contain ingredients referred to as "pungent", which may limit their placement within an ingredient matrix, such as 108. Pungent-type ingredients can be relatively strong such that once a pungent ingredient is pumped or otherwise drawn through a particular portion of a product dispenser, such as 102A, any associated path through the dispenser, such as 102A, such as tubing in the product dispenser, such as 102A, may be permanently flavored and any subsequent ingredient or fluid that is pumped or drawn through the path or tubing may be tainted with the taste of the pungent-type ingredient. As such, ones a pungent-type ingredient is used in an ingredient matrix, such as 108, an associated processor or controller, such as 106, can track or otherwise store information that controls or limits the replacement and/or addition of other pungent ingredients to certain locations of the ingredient matrix, such as 108, to avoid mixing pungent-type ingredients or tainting non-pungent ingredients in order to maintain product or beverage quality.

In another embodiment, one or more product ingredient packages, such as 116A-116Q, may requite agitation to keep the associated ingredient sufficiently mixed. In such instances, the location of such ingredients in an ingredient matrix, such as 108, can be limited to locations within the ingredient matrix, such as 108, that can be agitated as may be required and/or desired in a particular embodiment.

In another embodiment, ingredients from one or more of product ingredient packages, such as 116A-116Q, may be dispensed through antimicrobial-type tubing and/or dispenser parts. Such ingredients can include, but are not limited to, milk, dairy, soy, and/or other types and kinds of product ingredient packages. In these instances, the location of such ingredients in an ingredient matrix, such as 108, can be limited to locations within the ingredient matrix, such as 108, that utilize suitable antimicrobial-type tubing and/or dispenser parts as may be required and/or desired in a particular embodiment.

In yet another embodiment, a one-to-one relationship can be established between a particular product ingredient package, such as 116A, and at least one pump and/or valve, such as 120 and/or 122 respectively. In some instances, utilizing more than one pump and/or valve for a single product ingredient package, such as 116A, can draw a relatively higher volume of an ingredient from the package, such as 116A, in a relatively shorter period of time. For example, a product ingredient package containing a sweetener, such as sweetener, such as 116P, may utilize more than one pump and/or valve to draw a relatively higher volume of an ingredient from the package 116P in a relatively shorter period of time.

Returning to FIG. 1, any number of other product dispensers, such as 102A-102N, can also be in communication with the network, such as 104. In one embodiment, the communications network, such as 104, shown in FIG. 1 can be a local area network (LAN). In another embodiment, a communications network can be a wireless communications network capable of transmitting both voice and data signals, including image data signals or multimedia signals. Other networks can include, but are not limited to, Internet, a local area network (LAN), a wide area network (WAN), a LON WORKS network, a wired network, a wireless network, or any combination thereof.

The network, such as 104 of FIG. 1 is also shown in communication with at least one data processing resource, such as a server, such as 126, and at least one database, such as 128A. In this embodiment, a server, such as 126, can be a processor-based device capable of communicating with some or all of the product dispensers, such as 102A-102N via the communications network, such as 104, by way of a signal, such as a wireless frequency signal or a direct wired communication signal. In addition, a data processing resource or server, such as 126, can be used to aid or facilitate recipes, formulations, methods of making products or beverages, provide operational data processing, perform data processing relayed to consumer interaction, and/or perform other data processing as may be required and or desired in a particular embodiment. Such operational data processing can include, for example and not as a limitation, equipment status, maintenance, service alerts, predictive restock, and/or other types and kinds or operational data processing as may be required and/or desired in a particular embodiment. Such consumer interaction support can include, for example and not as a limitation, consumer preferences, consumer product or beverage preferences, loyalty, gaming, prizes, media content, customizations, and/ or other types and kinds of consumer interaction and/or data processing support as may be required and/or desired by a particular embodiment.

The server, such as 126 in FIG. 1, can include a processor, such as 130, and a computer-readable medium, such as a random access memory (RAM) 132, coupled to the processor, such as 130. The processor, such as 130, can execute computer-executable program instructions stored in memory, such as 132. Computer executable program instructions stored in memory, such as 132, can include any number of module application programs, such as a consumer interaction engine or module similar to 114. The consumer interaction engine or module similar to 114 can be adapted to implement various methods for consumer-interaction. In addition, a consumer interaction engine or module similar to 114 can be adapted to interact with one or more consumers, and one or more servers or data processing resources. Other examples of functionality and aspects of embodiments of a consumer interaction engine or module similar to 114 are described below.

Through the network, such as 104 in FIG. 1, some or all of the product dispensers, such as 102A-102N, can retrieve, receive, or otherwise access information stored in some or all of the databases, such as a recipes, formulations, and methods of making products or beverages database, such as 128A, operational database, such as 128B, and consumer database, such as 128C. In any instance, one or more of the databases can include product or beverage formation information such as one or more product or beverage recipes, formulations, and methods of making products or beverages. Such product or beverage recipes, formulations, and methods of making products or beverages can include an ingredient list, the ratio of each ingredient, a listing of how a product or beverage can be customized by a consumer, and/or other types and kinds of product or beverage recipes, formulations, and methods of making a product or beverage as may be required and/or desired by a particular embodiment.

In one embodiment, a product dispenser, such as 102A, can be configured to print a coupon or other document. In the embodiment shown, an associated printer or other output device, such as 136, can be in communication with the product dispenser, such as 102A. In other embodiments, a printer or other output device can be in communication with a product dispenser, such as 102A, via a network, such as 104.

The example environment or system, such as 100 shown in FIG. 1, can facilitate customer, consumer, and user interaction with a product dispenser and network. For example and not as a limitation, a user such as a consumer can make a product or beverage type selection at a product dispenser, such as 102A, by way of an input/output device, such as display device 112. An associated processor or controller, such as 106, can facilitate a user's selection via display device, such as 112, of a particular recipe to form a selected product, such as a beverage. The processor or controller, such as 106, can display one or more products or beverages for selection via the display device, such as 112. The user may select at least one of the products or beverages using the display device, such as 112, for instance, pressing a button provided by or associated with the display device, such as 112. The processor or controller, such as 106, may obtain from a local memory, such as 110, or may communicate via a network, such as 104, with at least one database, or may communicate with at least one data processing resource, such as server 126, to obtain corresponding ingredients and/or ratio of ingredients for forming the selected product or beverage. The processor or controller, such as 106, can utilize the information to operate one or more pumps, such as 120, and/or valves, such as 122, to form and dispense a product or beverage by way of a nozzle, such as 124, into a cup or other container, such as 136.

In another example, a user such as a customer or package installation personnel can facilitate scanning or reading one or more product ingredient packages, such as 116A-116Q, when the packages 116A-116Q are inserted within an ingredient matrix, such as 108, associated with a product dispenser, such as 102A. A processor or controller, such as 106, associated with the product dispenser, such as 102A, can identify an optimum or selected location within the ingredient matrix, such as 108. The user, customer, or package installation personnel can be informed where a particular product ingredient package, such as 116A, is to be located in the ingredient matrix, such as 108, by way of an input/output device, such as display device, such as 112. An example of a display device can include, but is not limited to, a light emitting diode (LED display indicator. LCD screen, input/ output (I/O) interface, audio interface or other types and kinds of displays or indicators as may be required and/or desired in a particular embodiment.

In one embodiment, insertion of a particular product ingredient package, such as 116A, within an ingredient matrix, such as 108, can be checked or otherwise verified by scanning a machine readable code on the respective package, such as 116A, and scanning a machine readable code located on the ingredient matrix, such as 108, at the point of insertion (illustrated as 118A). In this regard, an associated processor or controller, such as 106, can check or verify that the product ingredient package, such as 116A, is correctly located within the ingredient matrix, such as 108.

In another embodiment, a cup, such as 136, or other container can include identification information, such as a RFID or other machine readable tag, such as 138, mounted to the cup as shown in FIG. 1. In some embodiments, identification information can be associated with a consumer by way of, for instance, RFID or other machine readable tag, similar to 138, embodied in or otherwise mounted to an icon or other object. A reader, such as a RFID or other machine readable code reader, such as 140, associated with a product dispenser, such as 102A, can receive or otherwise obtain the identification information from the RFID or other machine readable tag, similar to 138. As shown in FIG. 1, a processor or controller, such as 106, associated with the product dispenser, such as 102A, can be in communication with the RFID or other machine readable code reader, such as 140, and some or all identification information obtained from the RFID or other machine readable tag, such as 138, can be stored or otherwise processed by the processor or controller, such as 106. In this embodiment, the identification information can be embodied in a machine readable code, a bar code, RFID, radio frequency, infrared, or other wireless communication methods or devices, or other types and kinds of coding and/or storage technologies as may be required and/or desired in a particular embodiment. The RFID reader or machine readable code reader, such as 140, can be a corresponding device to read or receive the identification information from the RFID or other machine readable tag, such as 138, and can include a RFID read/write device, an infrared device, a magnetic card reader, a bar code reader, or other suitable reader or receiver technologies as may be required and/or desired in a particular embodiment.

In yet another embodiment, a server or transaction processing resource, such as 142, can facilitate a payment or payment processing when a consumer selects and attempts to pay for a product, such as a beverage, at a product dispenser, such as 102A. An associated processor or controller, such as 106, can receive the consumer's payment or related information by way of, for instance, a display device, such as 112, data transmission, or other input, before, during, or after the selection of the particular product or beverage. In any instance, the processor or controller, such as 106, can transmit the payment or related information to the server or transaction processing resource, such as 142, via a network, such as 104. The server or transaction processing resource, such as 142, may access least one database, such as 128A-128C, or may communicate with at least one data processing resource, such as 126, to authorize or otherwise validate a payment or related information prior to accepting a payment from the consumer or otherwise dispensing the selected product or beverage to the consumer.

Figure 2:
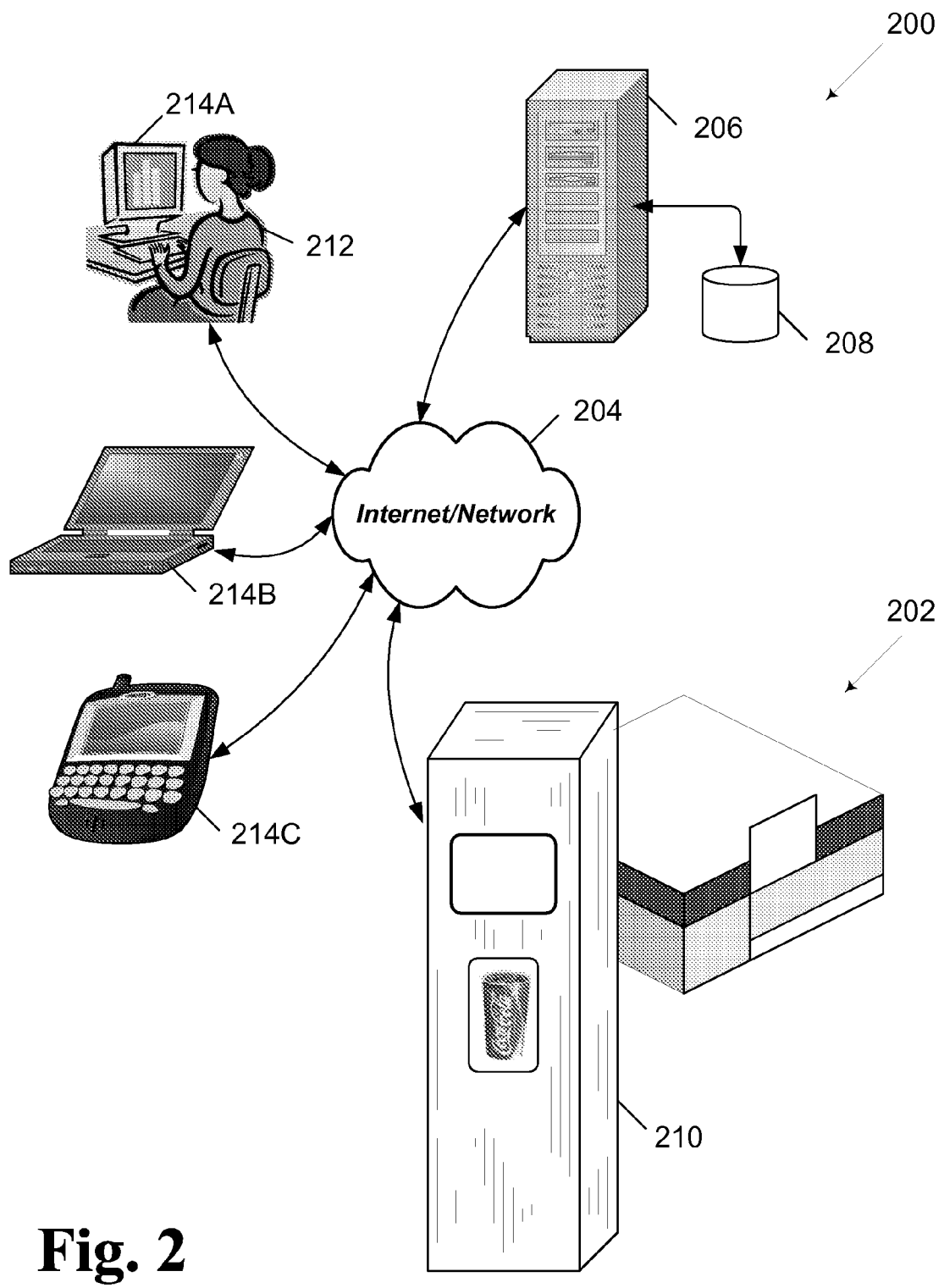
FIG. 2 illustrates one example of a consumer refreshment network in accordance with an embodiment of the invention.

Referring to FIG. 2, an example consumer refreshment environment or system 200 is illustrated. In one embodiment, one or more networked product dispensers, such as 210, can be installed in a plurality of respective locations, such as location 202, and can be in communication via a network 204, such as the internet or a global network, with one or more servers or data processing resource, such as 206, and one or more data storage devices such as database, such as 208. By way of example, a product dispenser 210 can be similar to a product dispenser or dispenser apparatus, described as 102A in FIG. 1. In one example, a produce dispenser such as 210 can include some or all of the following components as described with respect to FIG. 1: an ingredient matrix, such as 108, with locations operable to receive one or more product ingredient packages, such as 116A-116Q, a controller, such as 106, one or more package insertion detection devices or RFID reader/writer, such as 118A-118Q, pumps, such as 120, valves, such as 122, and a nozzle, such as 124. By way of further example, servers or data processing resources 206 can be similar to server or data processing resource described as 126 in FIG. 1.

In one embodiment, one or more consumers, such as 212, can access a network, such as 104, or a consumer refreshment network, such as 204. Through the network 204, a consumer, such as 212, can sign up, configure consumer preferences, access respective accounts, receive promotions, manage loyalty accounts, and/or sign up for other types and kinds of opportunities and services as may be required and or desired in a particular embodiment. In another embodiment, a consumer, such as 212, can choose to access a network 104 or a refreshment network system, such as 200, and one or more networked product dispensers, such as 210, by way of any number of client-type devices, including, but not limited to, a personal computer (PC), such as 214A, a data processing device, such as 214B, a wireless communication device, such as 214C, and/or by way of other types and kinds of data processing, processor-based, or client-type devices. An example or a wireless communication device can include, but is not limited to, a wireless data processing device, a wireless phone, a mobile phone, an IPHONE™, an IPOD™, personal data assistant, and or POCKET PC™.

Figure 3:
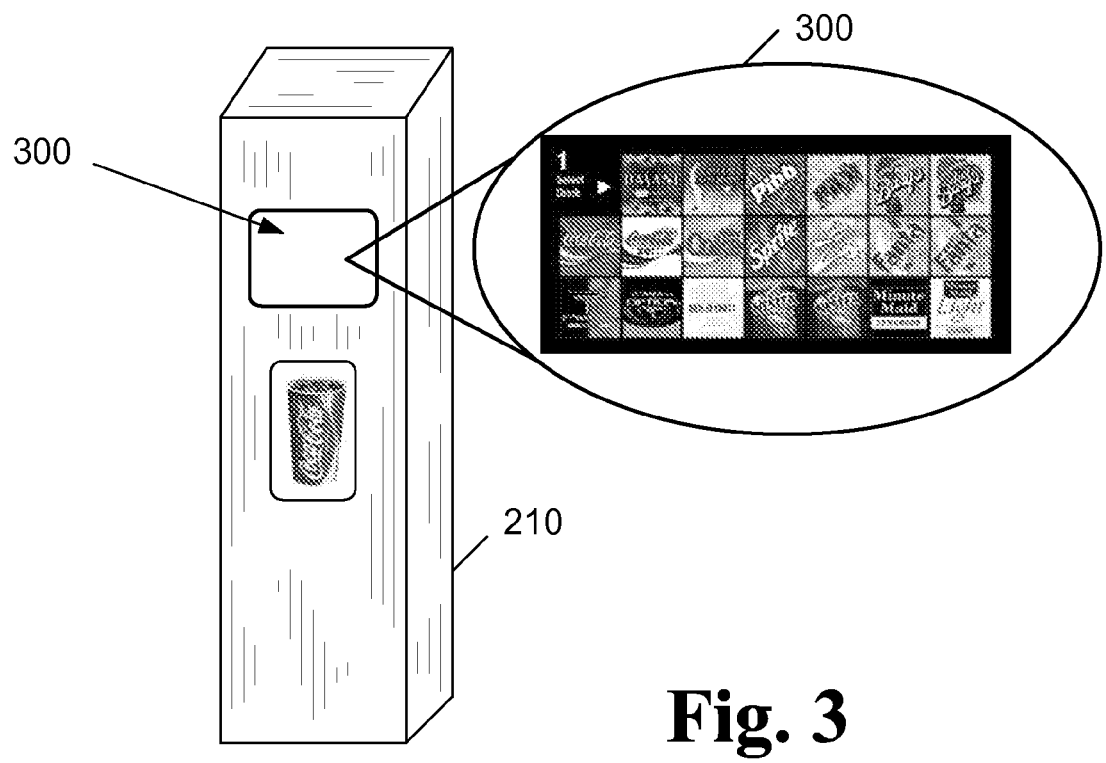
FIG. 3 illustrates one example of an enhanced view graphical user interface in accordance with an embodiment of the invention.

Referring to FIG. 3, an example of an enhanced view graphical user interface 300 is illustrated. In one embodiment shown, a product dispenser, such as 210 in FIG. 2, can include at least one user interface such as an enhanced view graphical user interface, such as 300, or a consumer interface. The user interface, such as 300, and can be used, for instance, by a consumer, such as 212, to select any number of different product or beverage types, kinds, and formulations. In use, a product dispenser, such as 210, with an enhanced view graphical user interface, such as 300, can provide a consumer with selectable product or beverage options in a series of dynamically generated menus, wherein the consumer can locate and select a specific brand, kind, type, and/or formulation of a desired corresponding product or beverage. Once a particular product or beverage option is selected, the consumer can cause a corresponding product or beverage to be formulated and dispensed by the product dispenser.

Figure 4:
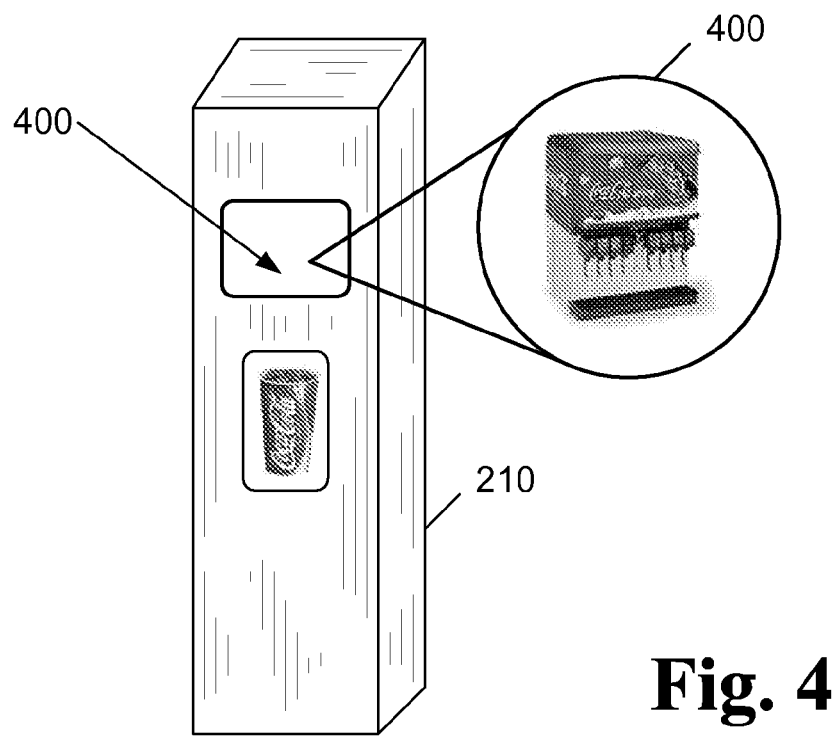
FIG. 4 illustrates one example of a classic view graphical user interface in accordance with an embodiment of the invention.

Referring to FIG. 4, another example of a user interface is shown. In one embodiment, a product dispenser, such as 210 in FIG. 2, can include a classic view graphical user interface, such as 400. The user interface, such as 400, can be used by a consumer, such as 212, to select from a limited number of different product or beverage types, kinds, and/or formulations. In use, a consumer, such as 212, can more easily select a product or beverage from a limited number of product or beverage choices. Once a particular product or beverage option is selected, the consumer can cause a corresponding product or beverage to be formulated and dispensed by the product dispenser. In some embodiments, a classic type graphical user interface can also be referred to as a traditional view as it generally resembles a traditional fountain dispensing valve design. As such, a classic type graphical user interface can be referred to as a traditional view graphical user interface.

In one embodiment, a consumer may desire fewer product or beverage choices than displayed by a product dispenser that allows the selection of, for instance, a plurality of different kinds of products or beverages. In such instances, a classic view graphical user interface with relatively fewer, more traditional product or beverage choices, and including one or more traditional-type product or beverage choices, can be displayed to facilitate, sometimes quicker, consumer interaction with the product dispenser.

In another embodiment, a consumer may elect to create one or more consumer preferences which may tailor the types and/or kinds of brands and/or product or beverage formulations displayed in a user interface, such as a classic view graphical user interface, essentially creating a consumer customized classic view graphical user interface. In this particular embodiment, a consumer can create a consumer customized classic view graphical user interface. For example, when a consumer identifies himself or herself to a product dispenser, such as 210, one or more consumer preferences can be retrieved by the dispenser 210. Based at least in part on one or more consumer preferences, the product dispenser 210 can display a default user interface to the consumer, which may be an enhanced view graphical user interface, a classic view graphical user interface, or a consumer customized classic view graphical user interface.

FIGS. 5-12 are example flowcharts for various methods in accordance with embodiments of the invention. Some or all of the illustrated methods can be implemented by a system, network, product dispenser, or any combination of associated components as shown in FIGS. 1-4.

Referring to FIG. 5, an example method 500 of building a database of product composition data records is illustrated. The method 500 begins in block 502. In block 502, an input is received from a consumer to dispense a product. In the embodiment shown, a processor or controller, such as 106 in FIG. 1, associated with the product dispenser, such as 102A, can allow the consumer to select and dispense a selected product. For example, a consumer may input or select the product via a user interface associated with the product dispenser, such as user interface 112. The processor or controller, such as 106, associated with the product dispenser, such as 102A, can allow the consumer to dispense a selected product.

Block 502 is followed by block 504, in which a product composition data record is built. In the embodiment shown, a processor or controller, such as 106 in FIG. 1, associated with the product dispenser, such as 102A, can build or otherwise generate a product composition data record or other file for storage and subsequent retrieval of product information. The controller, such as 106, can store the product composition data record or other file in an associated memory or data storage device, such as 110. A product composition data record or file can include, but is not limited to, type and/or kind of product selected, the volume or quantity of each ingredient dispensed in the forming of the product, the date and time the product was dispensed, any relevant consumer data, any relevant dispenser data, and/or other types and/or kinds of data. In one embodiment, a local and/or remote server or data processing resource, such as 126, can build or otherwise generate and store the product composition data record or other file in an associated memory or data storage device, such as 110 or 128A-128C. In any instance, a product composition data record is built.

In one embodiment, a product dispenser builds a product composition data record based at least in part on the type and/or kind of product selected, the volume or quantity of each ingredient dispensed in the forming of the product, the date and time the product was dispensed, any relevant consumer data, any relevant dispenser data, and/or other types and/or kinds of data, as may be required and/or desired in a particular embodiment.

Block 504 is followed by block 506, in which the product composition data record can optionally be combined with other types and/or kinds of data records. In the embodiment shown, a processor or controller, such as 106 in FIG. 1, associated with the product dispenser, such as 102A, can optionally combine other types of data and information to a product composition data record or other file for storage and subsequent retrieval of product information. The controller, such as 106, can store the other types of data and information with the product composition data record or other file in an associated memory or data storage device, such as 110. The controller, such as 106, can transmit the file to a local and/or remote server or data processing resource, such as 126, for storage and retrieval. In one embodiment, a local and/or remote server or data processing resource, such as 126, can store the other types of data and information in a product composition data record or other file in an associated memory or data storage device, such as 110 or 128A-128C. In any instance, the product composition data record can optionally be combined with other types and/or kinds of data records.

Block 506 is followed by block 508, in which product composition data records are data communicated locally and/or remotely to a data processing resource. In the embodiment shown, a processor or controller. Such as 106 in FIG. 1, associated with the product dispenser, such as 102A, can transmit the file to a local and/or remote server or data processing resource, such as 126, for storage and retrieval.

Block 508 is followed by block 510, in which the product composition data records are stored in a database at a data process resource. In this embodiment, a local and/or remote server or data processing resource, such as 126, can store the other types of data and information in a product composition data record or other file in an associated memory or data storage device, such as 110 or 128A-128C, for subsequent retrieval.

The method 500 ends after block 510.

In one embodiment, each time a consumer selects and/or dispense a product from a product dispenser a product composition data record is generated. Such a product composition data record can include, but is not limited to, the type and/or kind of product selected, the volume or quantity of each ingredient dispensed in the forming of the product, the date and time the product was dispensed, any relevant consumer data, any relevant dispenser data, and/or other types and kinds of data as may be required and/or desired. These product composition data records are data communicated between the product dispenser and a local and/or remote data processing resource. The product composition data records can be stored in a database and utilized in analysis of the product dispenser operation, utilized in restock, other supply chain applications, and/or utilized in other ways, as may be required and/or desired in a particular embodiment.

Referring to FIG. 6, an example method 600 for using a virtual ingredient matrix to track ingredient supply and ordering restock ingredients when virtual ingredient are below a threshold level is illustrated. The method 600 begins in block 602. In block 602, one or more product composition data records are queried from a database. In the embodiment shown, a processor or controller, such as 106 in FIG. 1, associated with the product dispenser, such as 102A, can query one or more product composition data records or other files from a memory, database, or data storage device, such as 110 or 128A-128C. The controller, such as 106, can retrieve some or all product composition data records or other files from the memory, database, or data storage device, such as 110 or 128A-128C. In one embodiment, a local and/or remote server or data processing resource, such as 126, can query one or more product composition data records or other files from a memory, database, or data storage device, such as 110 or 128A-128C. In any instance, one or more product composition records are queried from a database.

Block 602 is followed by block 604, in which the product composition data records are used to deplete volume or quantity from like virtual ingredients. In the embodiment shown, a processor or controller, such as 106 in FIG. 1, associated with the product dispenser, such as 102A, can deplete or otherwise reduce a volume and/or quantity from similar or like virtual ingredients based at least in part on some or all of the product composition data records. The controller, such as 106, can utilize some or all of the product composition data records and adjust the volume and/or quantity from similar or like virtual ingredients, and track changes in the volume and/or quantity of similar or like virtual ingredients. By way of example, if one or more queried product composition data records indicate that one ounce of cherry flavor was dispensed, then one ounce of cherry flavor can be subtracted from the volume of cherry flavor currently associated with the virtual cherry flavor ingredient. In this regard, the product composition data records can be used to adjust some or all virtual ingredient matrix ingredient levels, such that by processing the product composition data records, the virtual ingredients volume and quantity levels match the physical ingredients volume and quantity levels. A "virtual ingredient matrix level", "virtual ingredient", and other virtual-type data can represent data associated with a physical ingredient matrix in a product dispenser, such as ingredient matrix 108. Such data can stored in a memory, database, or data storage device, such as 110 or 128A-128C, and may also be stored in a processor or controller, such as 106, or local and/or remote server or data processing resource, such as 126. In one embodiment, a local and/or remote server or data processing resource, such as 126, can deplete or otherwise reduce a volume and/or quantity from similar or like virtual ingredients based at least in part on some or all of the product composition data records. In any instance, the product composition data records are used to deplete volume or quantity from like virtual ingredients.

Block 604 is followed by block 606, in which a determination as to the volume or quantity remaining of each virtual ingredient in the virtual ingredient matrix is effectuated. In the embodiment shown, a processor or controller, such as 106 in FIG. 1, associated with the product dispenser, such as 102A, can determine a volume or quantity remaining of each virtual ingredient in the virtual ingredient matrix. The controller, such as 106, can utilize some or all of the product composition data records and determine a volume or quantity remaining of each virtual ingredient in the virtual ingredient matrix. In one embodiment, a local and/or remote server or data processing resource such as 126, can determine a volume or quantity remaining of each virtual ingredient in the virtual ingredient matrix based at least in part on some or all of the product composition data records. In any instance, a determination as to the volume or quantity remaining of each virtual ingredient in the virtual ingredient matrix is effectuated.

Block 606 is followed by decision block 608, in which a determination is made as to whether any of the virtual ingredients need to be restocked. If the determination is in the affirmative, that is, an ingredient needs to be restocked then method continues at block 610. If the determination is in the negative, that is, an ingredient docs not need to be restocked, then the method 600 ends. In the embodiment shown, a processor or controller, such as 106 in FIG. 1, associated with the product dispenser, such as 102A, can determine whether any of the virtual ingredients need to be restocked. The controller, such as 106, can utilize some or all of the product composition data records to determine whether any of the virtual ingredients need to be restocked. For example, if die determination indicates that an ingredient is below a predefined level then the ingredient needs to be restocked. In one embodiment, a local and/or remote server or data processing resource, such as 126, can determine whether any of the virtual ingredients need to be restocked based at least in part on some or all of the product composition data records. In any instance, a determination is made as to whether any of the virtual ingredients need to be restocked.

In block 610, an order is placed for ingredients that have been depleted below a predetermined level. In the embodiment shown, a processor or controller, such as 106 in FIG. 1, associated with the product dispenser, such as 102A, can place an order for ingredients that have been depleted below a predetermined level. The controller, such as 106, can generate and transmit, or otherwise facilitate the placement of an order with, for instance, a third party, to obtain one or more ingredients that have been depleted below a predetermined level. For example, an order can effectuate physical restock ingredients to be shipped to the product dispenser location, such that when the ingredient is empty a restock ingredient will be on-hand to restock the product dispenser. In one embodiment, a local and/or remote server or data processing resource, such as 126, can generate and transmit, or otherwise facilitate the placement of an order with, for instance, a third party, to obtain one or more ingredients that have been depleted below a predetermined level. In any instance, an order is placed for ingredients dial have been depleted below predetermined level.

The method 600 ends after block 610.

In one embodiment, a virtual ingredient matrix can be maintained at a data processing resource. The virtual ingredient matrix can represent a physical ingredient matrix in a product dispenser. In operation, the virtual ingredient matrix can track the type and/or kinds of ingredients in the physical ingredient matrix. In addition, the virtual ingredient matrix can track the volumes and/or quantities of each of the ingredients in the physical ingredient matrix. In operation, as the data processing resource receives product composition data records indicating which product type and/or kinds as well as volumes and/or quantities of each ingredient dispensed the supply of ingredients can be depleted from the virtual ingredient matrix. In this regard, when the volume and/or quantity of the virtual ingredients are depleted to a predetermined level then a restock order can be triggered causing restock ingredients to be physically sent to the product dispenser location, ahead of running out of the ingredients. As such, the product dispenser will have restock supplies of ingredients on-hand when it is time to restock a depleted ingredient in the ingredient matrix.

Referring to FIG. 7, an example method of inventory management is illustrated.

The method 700 begins in block 702. In block 702, one or more product composition data records are queried from a database. In the embodiment shown, a processor or controller, such as 106 in FIG. 1, associated with the product dispenser, such as 102A, can query one or more product composition data records or other files from a memory, database, or data storage device, such as 110 or 128A-128C. The controller, such as 106, can retrieve some or all product composition data records or other files from the memory, database, or data storage device, such as 110 or 128A-128C. In one embodiment, a local and/or remote server or data processing resource, such as 126, can query one or more product composition data records or other files from a memory, database, of data storage device, such as 110 or 128A-128C. In any instance, one or more product composition records are queried from a database.

Block 702 is followed by block 704, in which a depiction rate is determined for each of the ingredients in the ingredient matrix. In the embodiment shown, a processor or controller, such as 106 in FIG. 1, associated with the product dispenser, such as 102A, can determine a depletion rate for some or all of the ingredients in an ingredient matrix. The controller, such as 106, can utilize some or all of the product composition data records to determine a depiction rate for some or all of the ingredients in an ingredient matrix. By way of example, the depletion rate for an ingredient relates to how quickly an ingredient is being used up. When used in one or more calculations with the available supply of the ingredient a projected date can be determined by which the ingredient will be estimated to be consumed, which can also be referred to as the end of ingredient supply date. In one embodiment, a local and/or remote server or data processing resource, such as 126, can determine a depletion rate for some or all of the ingredients in an ingredient matrix based at least in part on some or all of the product composition data records. In any instance, a depletion rate is determined for each of the ingredients in the ingredient matrix.

Block 704 is followed by block 706, in which the end of ingredient supply is calculated based in part on the estimated volume or quantity currently on-hand and the determined depletion rate for that ingredient. In the embodiment shown, a processor or controller, such as 106 in FIG. 1, associated with the product dispenser, such as 102A, can determine the end of ingredient supply based at least in part on the estimated volume or quantity currently on-hand and the determined depletion rate for that ingredient. The controller, such as 106, can utilize some or all of the product composition data records to determine the end of ingredient supply. In one embodiment, a local and/or remote server or data processing resource, such as 126, can determine the end of ingredient supply based at least in part on some or all of the product composition data records including the estimated volume or quantity currently on-hand and the determined depletion rate for that ingredient. In any instance the end of ingredient supply is calculated based in part on the estimated volume or quantity currently on-hand and the determined depletion rate for that ingredient.

Block 706 is followed by block 708, in which a determination which virtual ingredients need to be restocked is made. In the embodiment shown, a processor or controller, such as 106 in FIG. 1, associated with the product dispenser, such as 102A, can determine whether some or all of the virtual ingredients need to be restocked. The controller, such as 106, can utilize some or all of the product composition data records to determine whether some or all of the virtual ingredients need to be restocked. For example, a predetermined level or threshold can be used as a guide in determining how long of a supply, how much of the ingredient should be on hand, and/or other factors can be utilized to aid in determining which of the ingredients need to be restocked. In one embodiment, a local and/or remote server or data processing resource, such as 126, can determine whether some or all of the virtual ingredients need to be restocked based at least in part on some or all of the product composition data records including the predetermined level or threshold, which can be used in determining how long of a supply, how much of the ingredient should be on hand, and/or other factors can be utilized to aid in determining which of the ingredients need to be restocked. In any instance, a determination of whether some or all of the virtual ingredients need to be restocked is made.

Block 708 is followed by decision block 710, in which a determination is made as to whether any ingredients need to be restocked. If the determination is in the affirmative, that is, some ingredients need to be restocked, then method continues at block 712. If the determination is in the negative, that is, ingredients do not need to be restocked then the method ends. In the embodiment shown, a processor or controller, such as 106 in FIG. 1, associated with the product dispenser, such as 102A, can determine whether some or all of the ingredients need to be restocked. The controller, such as 106, can utilize some or all of the product composition data records to determine whether some or all of the ingredients need to be restocked. In one embodiment, a local and/or remote server or data processing resource, such as 126, can determine whether some or all of the ingredients need to be restocked based at least in part on some or all of die product composition data records including the predetermined level or threshold, which can be used in determining how long of a supply, how much of the ingredient should be on hand, and/or other factors can be utilized to aid in determining which of the ingredients need to be restocked. In any instance, a determination of whether some or all of the ingredients need to be restocked is made.

In block 712, an order is placed to restock the ingredients associated with depicted virtual ingredients. In the embodiment shown, a processor or controller, such as 106 in FIG. 1, associated with the product dispenser, such as 102A, can place an order is placed to restock the ingredients associated with depleted virtual ingredients or ingredients that have been otherwise identified as needing to be restocked. The controller, such as 106, can generate and transmit, or otherwise facilitate the placement of an order with, for instance, a third party, to obtain one or more ingredients that have been depleted below a predetermined level. For example, an order can effectuate a physical restock ingredient to be shipped to the product dispenser location such that when the ingredients are empty a restock ingredient can be on-hand to restock the product dispenser. In one embodiment, a local and/or remote server or data processing resource, such as 126, can generate and transmit, or otherwise facilitate the placement of an order with, for instance, a third party, to restock the ingredients associated with depleted virtual ingredients or ingredients that have been otherwise identified as needing to be restocked. In any instance, an order is placed to restock the ingredients associated with depleted virtual ingredients.

The method 700 ends after block 712.

In one embodiment, product composition data records can be used to calculate a rate of depletion for each ingredient in the ingredient matrix. The rate of depletion can then be used in combination with the virtual ingredient matrix that tracks the volume or quantity of each ingredient remaining to project when the ingredient will be empty and needs to be restocked. Such information can then be used to trigger ingredient restock ordering when certain conditions are reached such that restock ingredients are shipped to the product dispenser so that when the ingredient is empty a restock ingredient is on-hand.

Referring to FIG. 8, an example method 800 of synchronizing a virtual ingredient matrix ingredient volume or quantity level to match a restocked physical ingredient matrix ingredient volume or quantity level is illustrated. The method begins in block 802. In block 802, one or more ingredient packages are received within an ingredient matrix located within a product dispenser. In the embodiment shown, one or more ingredient packages, such as 116A-116Q in FIG. 1, can be inserted by personnel into an ingredient matrix associated with a product dispenser, such as 108. A processor or controller, such as 106 in FIG. 1, associated with the product dispenser, such as 102A, can detect the insertion of one or more ingredient packages such as 116A-116Q, as they are inserted.

Block 802 is followed by block 804, in which an ingredient data record is built. In the embodiment shown, a processor or controller, such as 106 in FIG. 1, associated with the product dispenser, such as 102A, can build or otherwise generate an ingredient data record or other file for storage and subsequent retrieval of product information. The controller, such as 106, can store the product composition data record or other file in an associated memory or data storage device, such as 110. A ingredient data record or file can include, but is not limited to, ingredient package insertion data, ingredient type and/or kind, volume or quantity remaining in the package, and/or other types and/or kinds of data, and/or other types and/or kinds of data. In one embodiment, a local and/or remote server or data processing resource, such as 126, can build or otherwise generate and store the ingredient data record or other file in an associated memory or data storage device such as 110 or 128A-128C. In any instance, an ingredient data record is built.

Block 804 is followed by block 806, in which the ingredient data record can optionally be combined with other types and/or kinds of data records. In the embodiment shown, a processor or controller, such as 106 in FIG. 1, associated with the product dispenser, such as 102A, can optionally combine other types of data and information with an ingredient data record or other file for storage and subsequent retrieval of product information. The controller, such as 106, can store the other types of data and information with the ingredient data record or other file in an associated memory or data storage device, such as 110. The controller, such as 106, can transmit the file to a local and/or remote server or data processing resource, such as 126, for storage and retrieval. In one embodiment, a local and/or remote server or data processing resource, such as 126, can store the other types of data and information in or combine them with a ingredient data record or other file in an associated memory or data storage device, such as 110 or 128A-128C. In any instance, the ingredient data record can optionally be combined with other types and/or kinds of data records.

Block 806 is followed by block 808, in which ingredient data records are communicated to a data processing resource. In the embodiment shown, a processor or controller, such as 106 in FIG. 1, associated with the product dispenser, such as 102A, can transmit the file to a local and/or remote server or data processing resource such as 126, for storage and retrieval.

Block 808 is followed by block 810, in which the virtual ingredient matrix is updated to indicate the ingredient was inserted into the physical ingredient matrix and the virtual ingredient matrix volume or quantity levels are adjusted to match the physical ingredient volume or quantity levels. In the embodiment shown, a processor or controller, such as 106 in FIG. 1, associated with the product dispenser, such as 102A, can update a virtual ingredient matrix to indicate a particular ingredient was inserted into the physical ingredient matrix, and also, if needed, adjust the virtual ingredient matrix volume or quantity levels to match the physical ingredient volume or quantity levels. The controller, such as 106, can utilize some or all of the ingredient data records to facilitate the update and adjustments. By way of example, the physical ingredient levels can be synchronized with the virtual ingredient levels. In one embodiment, a local and/or remote server or data processing resource, such as 126, can update a virtual ingredient matrix to indicate a particular ingredient was inserted into the physical ingredient matrix, and also, if needed, adjust the virtual ingredient matrix volume or quantity levels to match the physical ingredient volume or quantity levels based at least in part on some or all of the ingredient data records. In any instance, the virtual ingredient matrix is updated to indicate the ingredient was inserted into the physical ingredient matrix and the virtual ingredient matrix volume or quantity levels are adjusted to match the physical ingredient volume or quantity levels.

The method 800 ends after block 810.

In one embodiment, as an ingredient matrix associated with a product dispenser is changed with the restocking of ingredients, an ingredient data record can be communicated to a data processing resource to synchronize some or all physical ingredients volumes or quantities with some or all virtual ingredients volumes or quantities resident at the data processing resource. To effectuate this synchronization, an ingredient data record can be generated at the product dispenser. Such an ingredient data record can include, but is not limited to, ingredient package insertion data, the ingredient type and/or kind, volume or quantity remaining in the package, and/or other types and/or kinds of data, as may be required and or desired in a particular embodiment.

Figure 9:
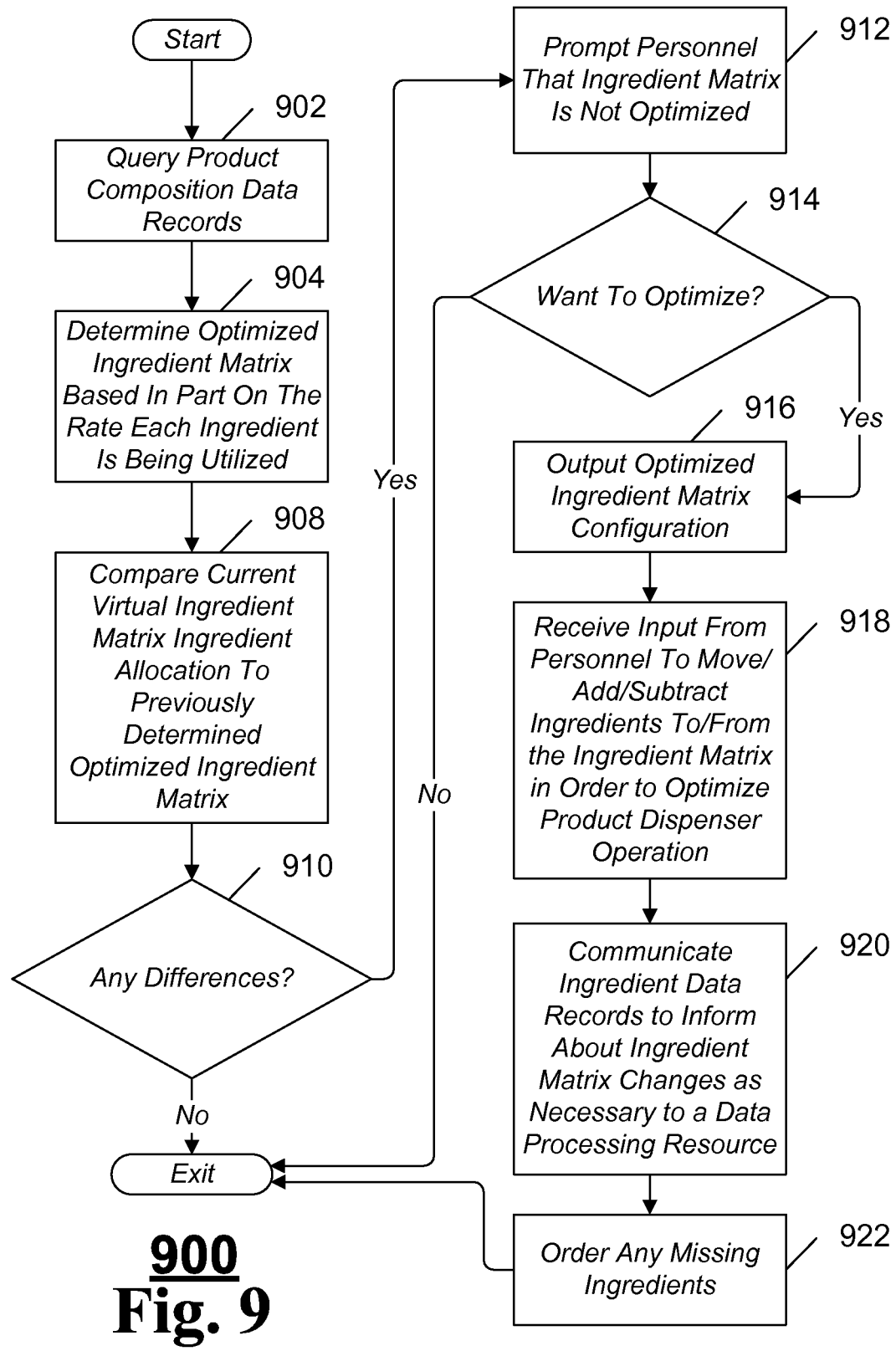
FIG. 9 illustrates one example of a method of determining an optimized ingredient matrix utilizing in part ingredient rate of depletion calculation in accordance with an embodiment of the invention.

Referring to FIG. 9, an example method 900 of determining an optimized ingredient matrix utilizing in part ingredient rate of depletion calculation is illustrated, the method 900 begins in block 902. In block 902, product composition data records are queried. In the embodiment shown, a processor or controller, such as 106 in FIG. 1, associated with the product dispenser, such as 102A, can query one or more product composition data records or other files from a memory, database or data storage device such as 110 or 128A-128C. The controller, such as 106, can retrieve some or all product composition data records or other files from the memory, database, or data storage device, such as 110 or 128A-128C. In one embodiment, a local and/or remote server or data processing resource, such as 126, can query one or more product composition data records or other files from a memory, database, or data storage device, such as 110 or 128A-128C. In any instance, one or more product composition data records are queried from a database.

Block 902 is followed by block 904, in which an optimized ingredient matrix is determined by analyzing the rate at which each of the ingredients is being consumed. In the embodiment shown, a processor or controller, such as 106 in FIG. 1, associated with the product dispenser, such as 102A, can determine an optimized ingredient matrix by analyzing the rate at which each of the ingredients is being consumed. The controller, such as 106, can utilize some or all of the product composition data records to determine an optimized ingredient matrix by analyzing the rate at which each of the ingredients is being consumed. By way of example, the rate at which each of the ingredients is being consumed can be referred to as the rate of depletion of an ingredient. The higher the rate of depletion for a particular ingredient, the quicker the ingredient is being consumed, and the more frequently the ingredient may need to be restocked. As such, optimizing the ingredient matrix can involve determining based at least in part on the rate of depletion which of some or all of the ingredients should have more than one slot in the ingredient matrix, which can effectively increase the supply volume or quantity of a particular ingredient. In one embodiment, a local and/or remote server or data processing resource, such as 126, can determine an optimized ingredient matrix based at least in part on some or all of the product composition data records including analyzing the rate at which each of the ingredients is being consumed. In any instance, an optimized ingredient matrix is determined by analyzing the rate at which each of the ingredients is being consumed.

Block 906 is followed by block 908, in which ingredient allocation in the current virtual ingredient matrix is compared to the previously determined optimized ingredient matrix. In the embodiment shown, a processor or controller, such as 106 in FIG. 1, associated with the product dispenser, such as 102A, can compare ingredient allocation in the current virtual ingredient matrix to any previously determined optimized ingredient matrix. The controller, such as 106, can utilize some or all of the product composition data records to compare ingredient allocation in the current virtual ingredient matrix to any previously determined optimized ingredient matrix. For example, based at least in part on one or more product composition data records, a rate of depletion of the ingredients can be determined, and an optimized ingredient matrix can further be determined. The optimized ingredient matrix can include, but is not limited to, a list of ingredients and how much of each ingredient should be in the physical ingredient matrix. A comparison of the determined optimized ingredient matrix with the current physical ingredient matrix can produce differences, which can be helpful in further optimization. In one embodiment, a local and/or remote server or data processing resource, such as 126, can compare ingredient allocation in the current virtual ingredient matrix to any previously determined optimized ingredient matrix. In any instance, ingredient allocation in the current virtual ingredient matrix is compared to the previously determined optimized ingredient matrix.

Block 908 is followed by decision block 910, in which a determination is made as to whether there are any differences between the determined optimized ingredient matrix and the current physical ingredient matrix. If the determination is in the affirmative, that is, there are differences, then method 900 continues at block 912. If the determination is in the negative, that is, there are not any differences, then the method 900 ends. In the embodiment shown, a processor or controller, such as 106 in FIG. 1, associated with the product dispenser, such as 102A, can determine whether there are any differences between the determined optimized ingredient matrix and the current physical ingredient matrix. The controller, such as 106, can utilize some or all of the product composition data records to determine whether there are any differences between the determined optimized ingredient matrix and the current physical ingredient matrix. For example, a comparison between ingredients in the determined optimized ingredient matrix and the current physical ingredient matrix can be performed. In one embodiment, a local and/or remote server or data processing resource, such as 126, can determine whether there are any differences between the determined optimized ingredient matrix and the current physical ingredient matrix based at least in part on some or all of the product composition data records. In any instance, a determination is made as to whether there are any differences between the determined optimized ingredient matrix and the current physical ingredient matrix.

In block 912, service personnel can be prompted that the ingredient matrix is not optimized. In the embodiment shown, a processor or controller, such as 106 in FIG. 1, associated with the product dispenser, such as 102A, can transmit a prompt or communication to service personnel, such as a service technician, or other personnel that the ingredient matrix is not optimized. For example, the processor or controller, such as 106, can transmit a message or communication via a user interface, such as 112. Alternatively, the processor or controller, such as 106, can communicate with a local and/or remote server or data processing resource, such as 126, and transmit or otherwise communicate a message to service personnel, such as a service technician, or other personnel via a network, such as 104, to one or more wireless communication devices associated with service personnel, a service technician or other personnel. In any instance, service personnel, such as a service technician, can be prompted that the ingredient matrix is not optimized.

Block 912 is followed by decision block 914, in which a determination is made as to whether the service personnel wants to optimize the current physical ingredient matrix. If the determination is in the affirmative, that is, the service personnel wants to optimize the physical ingredient matrix, then method 900 continues at block 916. If the determination is in the negative, that is, the service personnel does not want to optimize the physical ingredient matrix, then the method 900 ends. In the embodiment shown, a processor or controller, such as 106 in FIG. 1, associated with the product dispenser, such as 102A, can receive an indication or other input from service personnel, a service technician or other personnel whether the service personnel, service technician or other personnel wants to optimize the current physical ingredient matrix. For example, the processor or controller, such as 106, can receive an input, selection, message or communication from service personnel, a service technician or other personnel via a user interface, such as 112. Alternatively, the processor or controller, such as 106, can receive an input, selection, message or communication from service personnel, a service technician or other personnel via a local and/or remote server or data processing resource, such as 126, which is transmitted or otherwise communicated from the service technician or other personnel via a network, such as 104, from one or more wireless communication devices associated with service personnel, a service technician or other personnel. In any instance, a determination is made as to whether the service technician wants to optimize the current physical ingredient matrix.

In block 916, the optimized ingredient matrix is output. In the embodiment shown, a processor or controller, such as 106 in FIG. 1, associated with the product dispenser, such as 102A, can output or otherwise display an optimized ingredient matrix. For example, the controller, such as 106, can output or otherwise display an optimized ingredient matrix via a user interface associated with the product dispenser, such as user interface 112.

Block 916 is followed by block 918, in which an input is received from service personnel to move/add/subtract ingredients to and from the physical ingredient matrix in order to optimize product dispenser operation. In the embodiment shown, a processor or controller, such as 106 in FIG. 1, associated with the product dispenser, such as 102A, can receive an indication or other input from service personnel, a service technician or other personnel corresponding to any changed ingredients, such as moving an ingredient, adding an ingredient, or subtracting an ingredient, to and/or from the physical ingredient matrix in order to optimize product dispenser operation. In any instance, the physical ingredient matrix can be synchronized with the determined virtual ingredient matrix. For example, the processor or controller, such as 106, can receive an input, selection, message or communication from service personnel, a service technician or other personnel via a user interface, such as 112.

Block 918 is followed by block 920, in which ingredient data records are communicated to a data processing resource to inform about the changes that have been made to the physical ingredient matrix ingredient allocation. In the embodiment shown, a processor or controller, such as 106 in FIG. 1, associated with the product dispenser, such as 102A, can transmit the ingredient data records, including any changes to the physical ingredient matrix ingredient allocation, to a local and/or remote server or data processing resource, such as 126, for storage and retrieval. In addition, the changes can include confirmations and updates.

Block 920 is followed by block 922, in which any missing ingredients are ordered. In the embodiment shown, a processor or controller, such as 106 in FIG. 1, associated with the product dispenser, such as 102A, can place an order for any missing ingredients. The controller, such as 106, can generate and transmit, or otherwise facilitate the placement of an order with, for instance, a third party, to obtain one or more ingredients that are determined to be missing as well as any ingredients that were not immediately available to the service personnel, such as service technician, are ordered for delivery to the product dispenser location, as may be requited and/or desired in a particular embodiment. For example, an order can effectuate a physical ingredient to be shipped to the product dispenser location such that when the ingredients are empty a replacement ingredient can be on-hand to stock the product dispenser. In one embodiment, a local and/or remote server or data processing resource, such as 126, can generate and transmit, otherwise facilitate the placement of an order with, for instance, a third party, to obtain any missing ingredients or ingredients that have been otherwise identified as missing. In any instance, any missing ingredients are ordered.

The method 900 ends after block 922.

In one embodiment, one or more product composition data records can be utilized to determine an ingredient rate of depletion. By way of example, the ingredient rate of depletion can be characterized as the rate that ingredients are being consumed. Some or all of this information can be used to optimize the ingredient matrix. For example, if the rate of depletion of cherry flavoring is sufficiently high enough, an optimized ingredient matrix can indicate that two matrix slots instead of one should be dedicated to cherry flavoring to avoid or otherwise minimize ingredient outages or to minimize the frequency that cherry flavoring may need to be restocked.

Referring to FIG. 10, an example method 1000 of determining the amount of ingredient volume and/or quantity consumed and/or remaining in an ingredient package is illustrated. The method 1000 begins in block 1002. In block 1002, an input is received from a consumer to dispense a product. In the embodiment shown, a processor or controller, such as 106 in FIG. 1, associated with the product dispenser, such as 102A, can allow the consumer to select and dispense a selected product. For example, a consumer may input or select the product via a user interface associated with the product dispenser, such as user interface 112 in FIG. 1. The processor or controller, such as 106, associated with the product dispenser, such as 102A, can allow the consumer to dispense a selected product.

Block 1002 is followed by try block 1004, in which a product composition data record is built. In the embodiment shown, a processor or controller, such as 106 in FIG. 1, associated with the product dispenser, such as 102A, can build or otherwise generate a product composition data record or other file for storage and subsequent retrieval of product information. The controller, such as 106, can store the product composition data record or other file in an associated memory or data storage device, such as 110. A product composition data record or file can include, but is not limited to, type and/or kind of product selected or ingredient dispensed, the volume or quantity of each ingredient dispensed in the forming of the product, the date and time the product was dispensed, any relevant consumer data, any relevant dispenser data, and/or other types and/or kinds of data. In one embodiment, a local and/or remote server or data processing resource, such as 126, can build or otherwise generate and store the product composition data record or other file in an associated memory or data storage device, such as 110 or 128A-128C. In any instance, a product composition data record is built.

Block 1004 is followed by block 1006, in which the virtual ingredient matrix ingredient supply is depleted by the volumes and/or quantities as reflected in the product composition data record. In the embodiment shown, a processor or controller, such as 106 in FIG. 1, associated with the product dispenser, such as 102A, can deplete or otherwise reduce a volume and/or quantity from similar or like virtual ingredients based at least in part on some or all of the product composition data records. The controller, such as 106, can utilize some or all of the product composition data records and adjust the volume and/or quantity from similar or like virtual ingredients, and track changes in the volume and/or quantity of similar or like virtual ingredients. By way of example, if one or more queried product composition data records indicate that one ounce of cherry flavor was dispensed, then one ounce of cherry flavor can be subtracted from the volume of cherry currently associated with the virtual cherry flavor ingredient. In this regard, the product composition data records can be used to adjust some or all virtual ingredient matrix ingredient levels, such that by processing the product composition data records, the virtual ingredients volume and quantity levels match the physical ingredients volume and quantity levels. Such data can stored in a memory, database, or data storage device, such as 110 or 128A-128C, and may also be stored in a processor or controller, such as 106, or local and/or remote server or data processing resource, such as 126. In one embodiment, a local and/or remote server or data processing resource, such as 126, can deplete or otherwise reduce a volume and/or quantity from similar or like virtual ingredients based at least in part on some or all of the product composition data records. In any instance, the virtual ingredient matrix ingredient supply is depleted by the volumes and/or quantities as reflected in the product composition data record.

Block 1006 is followed by block 1008, in which the percentage of ingredient volume and/or quantity consumed and/or remaining is determined. In the embodiment shown, a processor or controller, such as 106 in FIG. 1, associated with the product dispenser, such as 102A, can determine the percentage of ingredient volume and/or quantity consumed and/or remaining. The controller, such as 106, can utilize some or all of the product composition data records to determine the percentage of ingredient volume and/or quantity consumed and/or remaining. For example, a determination can be based at least in part on the previous virtual ingredient volume or quantity less the amount of dispensed ingredient as indicated by the product composition data record. This determination can be extended to some or all ingredients in the virtual ingredient matrix such that the consumed or remaining volumes and quantities for some or all the virtual ingredient matrix are known. Since the virtual ingredient matrix can be synchronized with the physical ingredient matrix, the volumes and quantities of the virtual ingredients are approximately the same as the volumes and quantities of the physical ingredients. In one embodiment, a local and/or remote server or data processing resource, such as 126, can determine the percentage of ingredient volume and/or quantity consumed and/or remaining based at least in part on some or all of the product composition data records. In any instance, the percentage of ingredient volume and/or quantity consumed and/or remaining is determined.

Block 1008 is followed by block 1010, in which the product dispenser data optionally communicates locally and/or remotely with a data processing resource. In the embodiment shown, a processor or controller, such as 106 in FIG. 1, associated with the product dispenser, such as 102A, can transmit the ingredient data records, including any changes to the physical ingredient matrix ingredient allocation, to a local and/or remote server or data processing resource, such as 126, for storage and retrieval. For example, data communication can include data communicating percentage of consumed and or remaining ingredient in the ingredient matrix, and/or other types and/or kinds of data as may be required and/or desired in a particular embodiment.

Block 1010 is followed by block 1012, in which results are optionally written to a data processing device associated with the ingredient packaging. In the embodiment shown, a processor or controller, such as 106 in FIG. 1, associated with the product dispenser, such as 102A, can optionally write results to a data processing device associated with a product ingredient package, shown as 116A-116Q, or the ingredient packaging. For example, a data processing device can include, but is not limited to, a RFID tag, and/or other types and/or kinds of data processing devices, as may be required and/or desired in a particular embodiment.

In one embodiment, writing to a data processing device that is associated with the ingredient packaging can be advantageous in that as the ingredient packaging is moved to other product dispensers, the data related to the ingredients volumes and/or quantities consumed and/or remaining can be transferred as well as data in the data processing device.

The method 1000 ends after block 1012.

In one embodiment, when a consumer dispenses a product a product composition data record can be generated. The product composition data record indicates, among other things, the type and/or kind of ingredients dispensed and the volumes and/or quantities of those ingredients dispensed. As such, the product composition data records can be used to deplete a virtual supply of ingredients such that the volume and/or quantity of virtual ingredients reflects the volume and/or quantity of physical ingredients remaining in the product dispenser. The results can be data communicated to a data processing resource and/or written to a data processing device that is associated with the ingredient packaging. A data processing device can be, for example, a RFID tag, and/or other types and/or kinds of data processing devices, as may be required and/or desired in a particular embodiment.

Referring to FIG. 11, an example method 1100 for determining the amount of ingredient volume and/or quantity consumed and/or remaining in an ingredient package is illustrated. The method 1100 begins in block 1102. In block 1102, volumes and/or quantities are read from data processing devices associated with the ingredient packages. In the embodiment shown, a processor or controller, such as 106 in FIG. 1, associated with the product dispenser, such as 102A, can read or otherwise obtain data from one or more data processing device associated with respective product ingredient packages, shown as 116A-116Q, or the ingredient packaging. For example, one or more machine readable code readers 118A-118Q can read or obtain data from one or more data processing devices, such as a RFID tag, associated with respective product ingredient packages, shown as 116A-116Q, to obtain ingredient volumes and/or quantities contained within the packages.

Block 1102 is followed by block 1104, in which an input is received from the consumer to dispense a product. In the embodiment shown, a processor or controller, such as 106 in FIG. 1, associated with the product dispenser, such as 102A, can allow the consumer to select and dispense a selected product. For example, a consumer may input or select the product via a user interface associated with the product dispenser, such as user interface 112 in FIG. 1. The processor or controller, such as 106, associated with the product dispenser, such as 102A, can allow the consumer to dispense a selected product.

Block 1104 is followed by block 1106, in which a product composition data record is built. In the embodiment shown, a processor or controller, such as 106 in FIG. 1, associated with the product dispenser, such as 102A, can build or otherwise generate a product composition data record or other file for storage and subsequent retrieval of product information. The controller, such as 106, can store the product composition data record or other file in an associated memory or data storage device, such as 110. A product composition data record or file can include, but is not limited to, type and/or kind of product selected or ingredient dispensed, the volume or quantity of each ingredient dispensed in the forming of the product, the date and time the product was dispensed, any relevant consumer data, any relevant dispenser data, and/or other types and/or kinds of data. In one embodiment, a local and/or remote server or data processing resource, such as 126, can build or otherwise generate and store the product composition data record or other file in an associated memory or data storage device, such as 110 or 128A-128C. In any instance, a product composition data record is built.

Block 1106 is followed by block 1108, in which the virtual ingredient matrix ingredient supply is depleted by the volumes and/or quantities as reflected in the product composition data records. In the embodiment shown, a processor or controller, such as 106 in FIG. 1, associated with the product dispenser, such as 102A, can deplete or otherwise reduce a volume and/or quantity from similar or like virtual ingredients based at least in part on some or all of the product composition records. The controller, such as 106, can utilize some or all of the product composition records and adjust the volume and or quantity from similar or like virtual ingredients, and track changes in the volume and/or quantity of similar or like virtual ingredients. By way of example, if one or more queried product composition data records indicate that one ounce of cherry flavor was dispensed, then one ounce of cherry flavor can be subtracted from the volume of cherry flavor currently associated with the virtual cherry flavor ingredient. In this regard, the product composition data records can be used to adjust some or all virtual ingredient matrix ingredient levels, such that by processing the product composition data records, the virtual ingredients volume and quantity levels match the physical ingredients volume and quantity levels. Such data can stored in a memory, database, or data storage device, such as 110 or 129A-128C, and may also be stored in a processor or controller, such as 106, or local and/or remote server or data processing resource, such as 126. In one embodiment, a local and/or remote server or data processing resource, such as 126, can deplete or otherwise reduce a volume and/or quantity from similar or like virtual ingredients based at least in part on some or all of the product composition data records. In any instance, the virtual ingredient matrix ingredient supply is depleted by the volumes and/or quantities as reflected in the product composition data records.

Block 1108 is followed by block 1110, in which the product dispenser data optionally communicates locally and/or remotely with a data processing resource. In the embodiment shown, a processor or controller, such as 106 in FIG. 1, associated with the product dispenser, such as 102A, can transmit the ingredient data records, including any changes to the physical ingredient matrix ingredient allocation, to a local and/or remote server or data processing resource, such as 126, for storage and retrieval. For example, data communication can include data communicating percentage of consumed and/or remaining ingredients in the ingredient matrix, and/or other types and/or kinds of data as may be required and/or desired in a particular embodiment.

Block 1110 is followed by block 1112, in which results are optionally written to a data processing device associated with the ingredient packaging. In the embodiment shown, a processor or controller, such as 106 in FIG. 1, associated With the product dispenser, such as 102A, can optionally write results to a data processing device associated with a product ingredient package, shown as 116A-116Q, or the ingredient packaging. For example, a data processing device can include, but is not limited to, a RFID tag, and/or other types and/or kinds of data processing devices, as may be required and/or desired in a particular embodiment. In one embodiment, writing to a data processing device that is associated with the ingredient packaging can be advantageous in that as the ingredient packaging is moved to other product dispensers, the data related to the ingredients volumes and/or quantities consumed and/or remaining can be transferred as well as data in the data processing device.

The method 1100 ends after block 1112.

In one embodiment the ingredient volume or quantity consumed or remaining can be written on a data processing device that is associated with the ingredient packaging. In operation, the data processing device can be read, adjusted by processing beverage consumption data records, and written back to the data processing device. In this regard, the data processing device always contains the most recent information regarding the ingredient's volume or quantity consumed and remaining.

Figure 12:
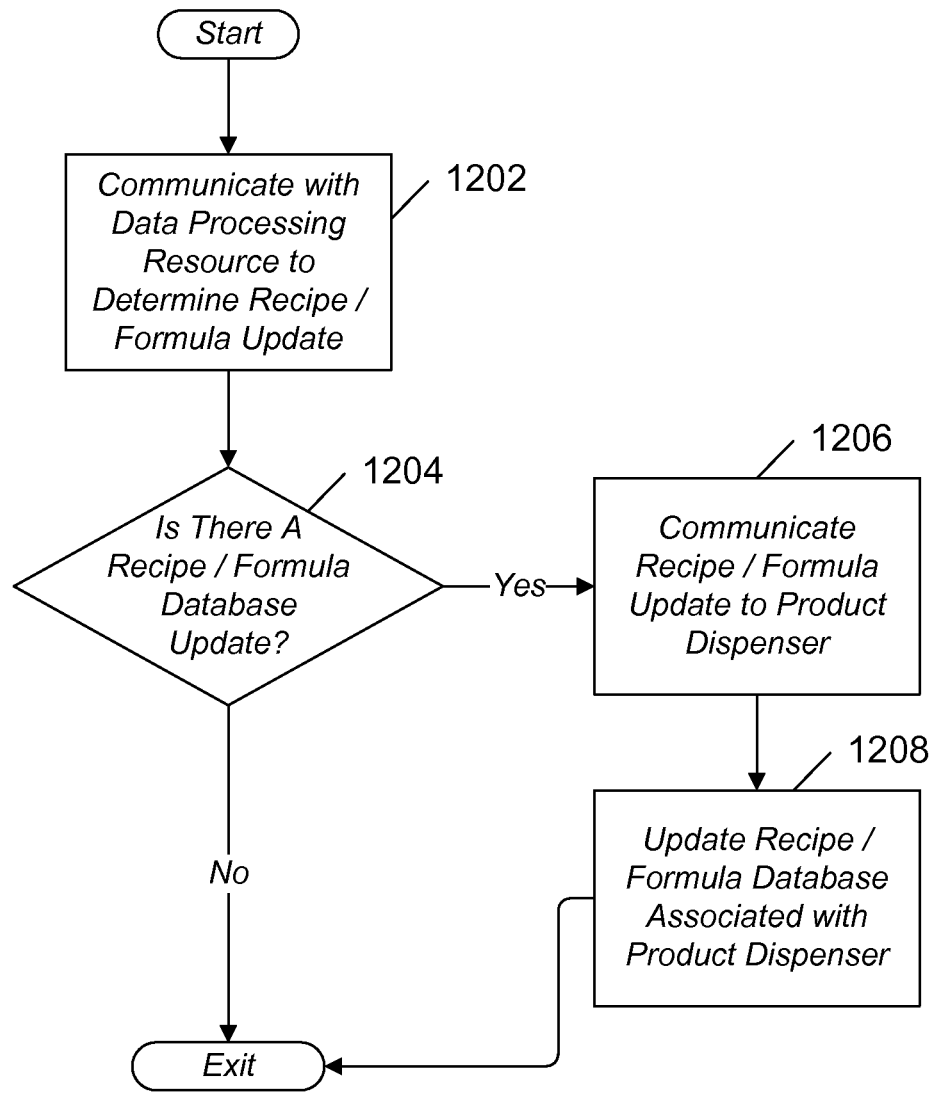
FIG. 12 illustrates one example of a method of updating a recipe/formula database in a product dispenser in accordance with an embodiment of the invention.

Referring to FIG. 12, an example method 1200 of updating a recipe/formula database in a product dispenser is illustrated. The method 1200 begins in block 1202. In block 1202, a product dispenser communicates locally and/or remotely with a data processing resource. In the embodiment shown, a processor or controller, such as 106 in FIG. 1, associated with the product dispenser, such as 102A, can communicate via a network, such as 104, with a local and/or remote server or data processing resource, such as 126. For example, data communication can include, but is not limited to, a check to see if a more recent version of the recipe/formula database is available for download from the data processing resource to the product dispenser.

Block 1202 is followed by block 1204, in which a determination is made as to whether there is a recipe/formula database update available. If the determination is in the affirmative, that is, there is an update available, then method 1200 continues at block 1206. If the extermination is in the negative, that is, there is not an update available, then the method 1200 ends. In the embodiment shown, a processor or controller, such as 106 in FIG. 1, associated with the product dispenser, such as 102A, can compare a current version with the version of the recipe/formula database that may be available for download from the data processing resource, such as 126. In one embodiment, a local and/or remote server or data processing resource, such as 126, can compare a current version with the version of the recipe/formula database that may be available for download. In any instance, a determination is made as to whether there is a recipe formula database update available.

In block 1206, the more recent version of the recipe/formula is communicated from the data processing resource to the product dispenser. In the embodiment shown, a data processing resource, such as 126 in FIG. 1, can transmit via a network, such as 104, a more recent version of the recipe/formula to a product dispenser, such as 102A. A processor or controller, such as 106, associated with the product dispenser, such as 102A, can receive the updated version of the recipe/formula database.

Block 1206 is followed by block 1208, in which the product dispenser recipe/formula database is updated. In the embodiment shown, a processor or controller, such as 106 in FIG. 1, associated with the product dispenser, such as 102A, can store or otherwise install the updated version of the recipe/formula database received from the data processing resource, such as 126, in an associated memory or data storage device, such as 110.

The method 1200 ends after block 1208.

In one embodiment, a recipe/formula database can be maintained at a data processing resource. Periodically, the recipe/formula database can be compared to a version of a database in a product dispenser. If the version of the database in the product dispenser needs to be updated, then the recipe/formula database can be communicated from the data processing resource to the product dispenser.

The capabilities of various embodiments of the invention can be implemented in software, firmware, hardware or some combination thereof.

As one example, one or more aspects of the invention can be included in an article of manufacture (e.g., one or more computer program products) having, for instance, computer usable media. The media has embodied therein, for instance, computer readable program code means for providing and facilitating the capabilities of the embodiment of the invention. The article of manufacture can be included as a part of a computer system or sold separately. One example of a suitable article of manufacture is a consumer interaction engine or module, such as 114 described in FIG. 1.

Additionally, at least one program storage device readable by a machine, tangibly embodying at least one program or set of instructions executable by the machine to perform the capabilities of the embodiment of the invention can be provided. One example of a suitable program storage device readable by machine is a memory or data storage device, such as 110 described in FIG. 1.

The flow diagrams depicted herein are examples. There may be many variations to these diagrams or the elements (or operations) described therein without departing from the scope of the claimed invention. For instance, the elements may be performed in a differing order, or elements may be added, deleted or modified. All of these variations are considered a part of the claimed invention.

While embodiments of the invention have been described, it will be understood that those skilled in the art, both now and in the future, may make various improvements and enhancements which fall within the scope of the claims which follow. These claims should be construed to maintain the proper protection for the invention first described.

That which is claimed is:

1. A method, comprising:
generating, at a controller associated with a beverage dispenser, a beverage composition record for a beverage that is formulated via an ingredient matrix and dispensed at the beverage dispenser, wherein the ingredient matrix comprises multiple ingredient packages each comprising a beverage ingredient; and
writing depletion data to the ingredient package or to a data processing device associated with the ingredient package for each ingredient package from which a beverage ingredient was included in the dispensed beverage, wherein the depletion data is based at least in part on the beverage composition record.

2. The method of claim 1, further comprising adjusting a virtual ingredient matrix based at least in part on the beverage composition record for the dispensed beverage.

3. The method of claim 2, wherein the adjusting comprises adjusting one or more ingredient levels of the virtual ingredient matrix so that virtual ingredient volume and quantity levels match volume and quantity levels of beverage ingredients in the ingredient matrix.

4. The method of claim 1, wherein the generating is performed after beverage selection data is received by the controller, the beverage composition record corresponding to the beverage selection data.

5. The method of claim 1, wherein the depletion data is written to the data processing device associated with the ingredient package.

6. The method of claim 5, wherein the data processing device comprises an RFID tag.

7. The method of claim 1, wherein the generating is performed in response to dispense of the beverage by the beverage dispenser.

8. The method of claim 1, wherein the depletion data comprises at least one of ingredient volume depletion data or independent quantity depletion data.

9. The method of claim 1, further comprising determining an amount of ingredient volume or ingredient quantity that is one of consumed and remaining in at least one of the ingredient packages.

10. The method of claim 1, wherein the writing is performed by the controller or by at least one writing device associated with the ingredient matrix.

11. A device, comprising:
at least one memory storing computer-executable instructions; and
at least one processor communicatively coupled to the at least one memory and the display and configured to access the at least one memory and execute the computer-executable instructions to:
generate a beverage composition record for a beverage that is formulated via an ingredient matrix and dispensed at the beverage dispenser, wherein the ingredient matrix comprises multiple ingredient packages each comprising a beverage ingredient; and
write depletion data to the ingredient package or a data processing device associated with the ingredient package for each ingredient package from which a beverage ingredient was included in the dispensed beverage, wherein the depletion data is based at least in part on the beverage composition record.

12. A beverage dispensing system, comprising:
at least one memory storing computer-executable instructions;
an ingredient matrix comprising multiple ingredient packages each comprising a beverage ingredient;
a dispenser;
a user interface to receive beverage selection input; and
a controller in communication with the user interface, wherein the controller is configured to:
generate a beverage composition record for a beverage that is formulated via the ingredient matrix and dispensed at the dispenser responsive to the beverage selection input; and
for each ingredient package from which a beverage ingredient is included in a dispensed beverage, cause depletion data to be written to the ingredient package or a data processing device associated with the ingredient package based at least in part on the beverage composition record generated for the dispensed beverage.

13. The system of claim 12, wherein the memory stores a virtual ingredient matrix corresponding to the ingredient matrix; and
wherein the controller is further configured to adjust the virtual ingredient matrix based at least in part on the beverage composition record for the dispensed beverage.

14. The system of claim 13, wherein the controller is configured to adjust one or more ingredient levels of the virtual ingredient matrix so that virtual ingredient volume and quantity levels match volume and quantity levels of beverage ingredients in the ingredient matrix.

15. The system of claim 12, wherein the depletion data is written to the data processing device associated with the ingredient package.

16. The system of claim 15, wherein the data processing device comprises an RFID tag.

17. The system of claim 12, wherein the controller is configured to generate the beverage composition record in response to dispense of the beverage by the beverage dispenser.

18. The system of claim 12, wherein the depletion data comprises at least one of ingredient volume depletion data or independent quantity depletion data.

19. The system of claim 12, wherein the controller is configured to determine an amount of ingredient volume or ingredient quantity that is consumed or remaining in at least one of the ingredient packages.

20. The system of claim 12, wherein writing of the depletion data is performed by the controller or by at least one writing device associated with the ingredient matrix.

* * * * *